(12) United States Patent
Stieber et al.

(10) Patent No.: US 12,275,347 B1
(45) Date of Patent: Apr. 15, 2025

(54) SYMMETRICAL AUTONOMOUS VEHICLE DIRECTION INDICATION

(71) Applicant: Zoox, Inc., Foster City, CA (US)

(72) Inventors: Andrew Mark Stieber, Foster City, CA (US); Nahuel Elias Battaglia, Stanford, CA (US); Kevin Mark Karol, San Francisco, CA (US); Steven Matthew Schleibaum, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 316 days.

(21) Appl. No.: 17/899,565

(22) Filed: Aug. 30, 2022

(51) Int. Cl.
  *B60Q 1/50* (2006.01)
  *B60W 60/00* (2020.01)
(52) U.S. Cl.
  CPC ........... *B60Q 1/507* (2022.05); *B60W 60/005* (2020.02)
(58) Field of Classification Search
  None
  See application file for complete search history.

(56) References Cited

U.S. PATENT DOCUMENTS

| | | | |
|---|---|---|---|
| 11,763,574 B2 * | 9/2023 | Creusot | G06F 18/25 |
| | | | 340/937 |
| 2018/0088035 A1 * | 3/2018 | Kurasawa | G01N 21/359 |
| 2019/0385025 A1 * | 12/2019 | McMichael | G06V 10/82 |
| 2022/0057797 A1 * | 2/2022 | Ramsager | G05D 1/028 |
| 2022/0130254 A1 * | 4/2022 | Austin | H04W 4/46 |

\* cited by examiner

*Primary Examiner* — James J Lee
*Assistant Examiner* — David Hatch
(74) *Attorney, Agent, or Firm* — Lee & Hayes, P.C.

(57) ABSTRACT

Techniques are described for uniquely identifying a quadrant of a symmetrical vehicle, such as a symmetrical autonomous vehicle. The techniques include using service indicator lights to convey information regarding the status and operational mode of the vehicle to an observer and/or service technician. The service indicator lights may uniquely identify quadrants of the vehicle for orienting the vehicle with a representation of the vehicle to guide a technician to a particular location and component of the vehicle located within the identified quadrant.

20 Claims, 15 Drawing Sheets

SYMMETRICAL AUTONOMOUS VEHICLE DIRECTION INDICATION

BACKGROUND

Autonomous vehicles, such as the type configured to transport passengers in an urban environment, may encounter many situations in which an autonomous vehicle ought to notify persons, vehicles, and the like, of an operational intent of the vehicle, such as a direction the autonomous vehicle is driving in or will be driving in, for example. Moreover, passengers of an autonomous vehicle may experience some uncertainty as to determining which autonomous vehicle is tasked to service their transportation needs. For example, if there are many autonomous vehicles present, a passenger who has scheduled a ride in one of those autonomous vehicles may wish to easily distinguish which autonomous vehicle is intended for him/her.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
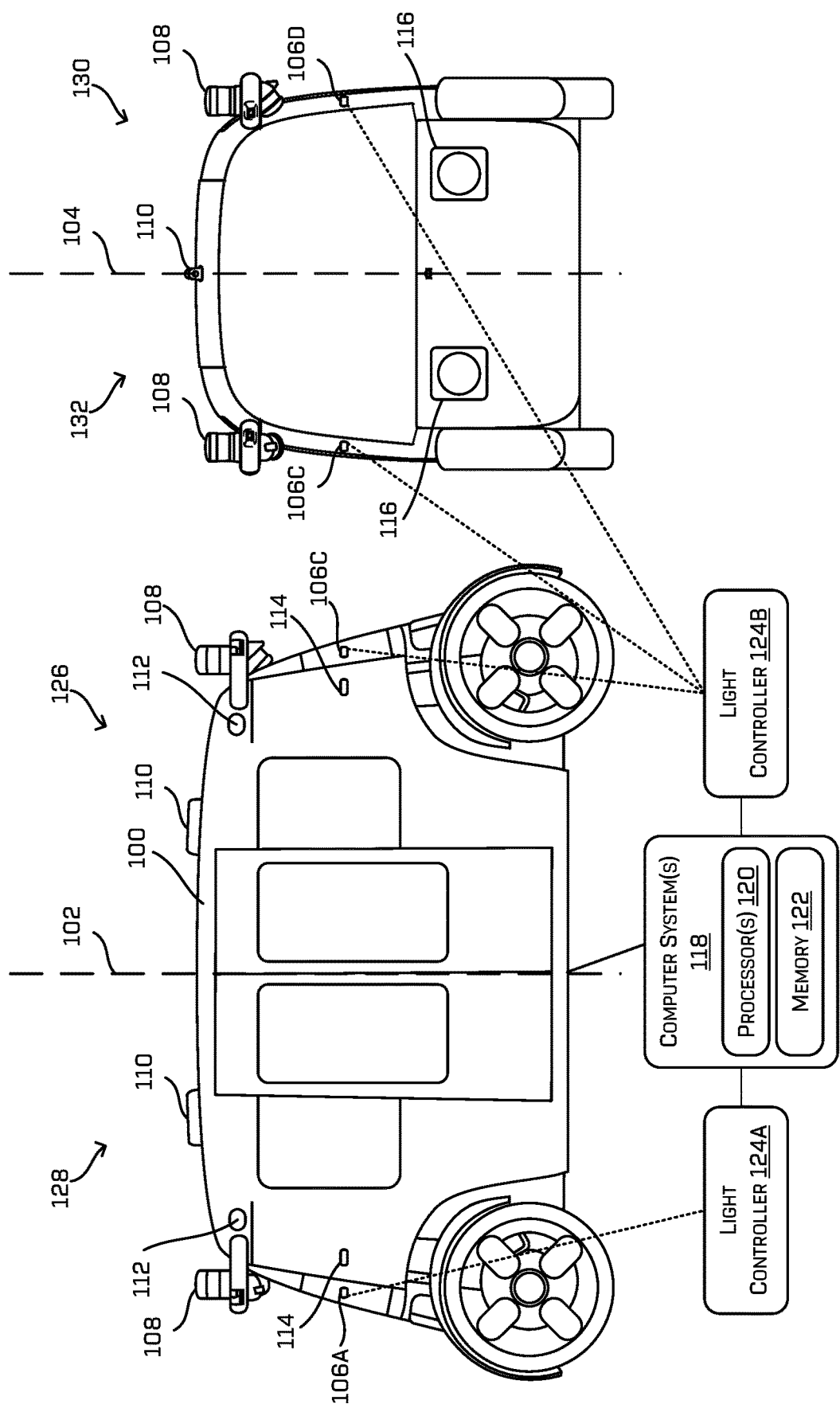
FIG. 1 illustrates a symmetrical vehicle with features for identifying an orientation of the vehicle, according to at least one example.

Techniques described herein are directed to indicators used to identify a status and/or a quadrant of a symmetrical vehicle. For example, a symmetrical vehicle may be able to travel bidirectional in a first direction and a second direction opposite the first direction, with opposite ends of the symmetrical vehicle able to serve as the front of the vehicle while traveling, depending on the direction of travel. In some examples, the symmetrical vehicle may only travel in a single direction but may still be symmetrical as described herein. The symmetrical vehicle can be mirrored across two different axes, a first axis aligned with a length of the vehicle from the first end to the second end and a second axis aligned with a width of the vehicle, perpendicular to the first axis. Accordingly, the symmetrical vehicle may have indistinguishable ends and identical or mirror image quadrants of the vehicle. Therefore, in a service depot or other situation where a particular quadrant of the vehicle needs to be uniquely identified, for example to service a particular component in an error state, the indicators described herein can be used to uniquely identify a quadrant of the vehicle for various purposes.

In examples, four quadrants may form a symmetrical autonomous vehicle. The four quadrants may include a first pair of identical (or nearly identical-looking) units disposed at two diagonally opposite corners of the vehicle, and a second pair of identical (or nearly identical-looking) units disposed at two other diagonally opposed corners of the vehicle. The second pair of units may be a mirror image (or nearly-mirror image) of the first pair of units, such that all four quadrants may be substantially indistinguishable to an observer. The autonomous vehicle may not have a front or a rear and may be configured for symmetrical travel. As one example, the autonomous vehicle may not backup (e.g., reverse) to change direction of travel, and may instead stop driving in a first direction and continue travel in a second direction. The quadrants of the vehicle may be symmetrically disposed relative to each other (e.g., symmetrical relative to a point of reference on the vehicle).

Due to the symmetric nature of the symmetrical vehicle, it may be difficult to determine what a specific portion of the vehicle is and where a particular component is located since typical indicators such as front and rear of typical vehicles do not provide visual cues due to the mirrored nature of the symmetrical vehicle. Additionally, though an exterior appearance of the vehicle may be mirrored, the interior components may or may not be mirrored within the symmetrical vehicle. The symmetric qualities of the vehicle may enable bidirectional functionality of the vehicle wherein one end is the primary forward facing end during one mode of operation and transitions to be the rear end during another (with correspondingly homologated features such as lights, etc.).

Indicator lights disposed in each of the quadrants may be used to identify quadrants of the vehicle and may additionally or alternatively be used to display or provide indications of status information or other additional dimensions of data related to the operation and/or status of the vehicle. The indicator lights can provide information in each of the quadrants of the vehicle to uniquely identify quadrants, provide information on vehicle status, and other such information related to the operation of the vehicle through the use of varying illumination modes for the indicator lights. For example, the indicator lights may be used to indicate vehicle states while operational (e.g., on a mission, in standby awaiting a mission, waiting for a passenger, etc.), service status, battery status, charging status, error codes, quadrant identity, etc.

The indicator lights may be used to display different colors, patterns, and alternating illumination that can be used to identify a particular quadrant, for example by illuminating the indicator light in the subject quadrant. The colors and/or patterns of the indicator light may be used to identify particular status and service information. The indicator may specifically be a lamp that is separate from lamps regulated by governmental bodies. In this manner, additional colors and pattern options may be available for displaying by the indicator lights that may not be possible with typical regulated vehicle lamps.

When a vehicle enters a service depot, a service technician may know, based on an error report or other information, of a fault existing within a particular component of the vehicle. However, the location of the component, particularly in a symmetrical vehicle, may be uncertain as the orientation of the vehicle may not be readily apparent to the technician. In such an example, the vehicle, upon entering a service status, may display, using indicator lights of the vehicle, a flashing light, a color pattern, or other indication of the subject quadrant of the vehicle. In some examples, a first quadrant may be identified by the indicator light, with the service report indicating a location of the component relative to the first quadrant. For example, a first quadrant, such as a northwest quadrant, may be identified as the first quadrant using an indicator light. The northwest quadrant is not a reference to a geomagnetic direction, but is used for convenience to refer to a particular quadrant (from a top view) of the symmetrical vehicle. The error or fault may be reported as related to a component located in a southeast quadrant. Therefore, a service technician or operator may readily identify the component using the indicator lights on the physical vehicle. In this manner, the indicator lights serve to provide a physical indicator on the vehicle that is used to interpret information provided in an error code or other system that may be independent of the physical realm, such as in a computing environment of the service depot.

In some examples, the indicator lights may flash in sync with indicator lights of adjacent symmetrical vehicles. For example, the indicator lights may be configured to flash at a regular interval synced with a universal or network connected clock such that the indicator lights flash simultaneously. In this manner, visual noise from flashing lights within a service depot may be reduced.

In some examples, additional indicators may provide information related to the location of a particular quadrant, such as the use of audio cues, haptic or tactile cues, augmented reality cues (e.g., visible as a computer-generated graphic, label, or other augmentation of the real-world view using a headset, glasses, tablet, phone, or other electronic device). For example, in the case of audio cues, an audible signal may be output by speakers on the vehicle and may be used to generate a tone or chime to identify a particular quadrant of the vehicle, either to provide a guide for orienting a service report with the physical vehicle or for other purposes. In some examples, the audio signal may be outside of a normal perceptible range by human ears. In such examples, a detector within a service depot or other location may be used to identify the quadrant where the audio signal originates without avoiding audible distractions while operating the vehicle.

In some examples, the indicators may emit a signal outside of a visible spectrum. For example, the indicators may emit in an infrared or ultraviolet spectrum to convey information without adding an indicator visible to the naked eye on the exterior of the vehicle. The non-visible spectrum may be used for indicator emissions to avoid distractions to other vehicles on the road or other observers. In such examples, in a service depot, one or more components for detecting the non-visible spectrum may be used to identify the indicator and therefore identify the quadrant of the symmetrical vehicle.

In some examples, the indicators may only be active during particular phases and/or vehicle states. For instance, the indicators may only be active while in a service status, while located in a service depot, during passenger pickup, in a particular (e.g., manual) drive domain, within a geofenced region, at or near a charging station. The indicators may be deactivated outside of those states, locations, and/or phases to reduce visual clutter and distractions.

In some examples, the indicators may include a display panel, such a configurable LED array that may be used to emit a color and/or pattern as described herein, that may also be configured to display information, such as a code, using the array to display letters and/or numbers by selectively illuminating LED bulbs in the array.

FIG. 1 illustrates a symmetrical vehicle 100 with features for identifying an orientation of the symmetrical vehicle 100, according to at least one example. The symmetrical vehicle 100 is displayed as an autonomous vehicle that includes sensor arrays 108 and 110 for gathering sensor data regarding the surrounding environment. The symmetrical vehicle 100 is symmetric across a first axis 102. The first axis 102 is aligned with a width of the symmetrical vehicle 100, with a first end 126 disposed on a first side of the first axis 102 and a second end 128 disposed on a second side of the first axis 102. The first end 126 and the second end 128 may be mirror images of each other. In some examples, the first end 126 and the second end 128 may each include similar and/or identical components (such as nearly identical or mirror-image components). In some examples, the symmetry of the first end 126 and the second end 128 may cause confusion for servicing the vehicle since identical components may be located in the mirrored ends. Accordingly, uniquely identifying the first end 126 from the second end 128 may be useful for identifying components to service, replace, or to otherwise interact with.

The symmetrical vehicle 100 is also symmetric across a second axis 104. The second axis 104 is aligned along a length of the symmetrical vehicle 100 from the first end 126 to the second end 128. The second axis 104 divides the symmetrical vehicle 100 into a first side 130 and a second side 132. The first side 130 is disposed on a first side of the second axis 104 while the second side 132 is disposed on an opposite side of the second axis 104. The first side 130 and the second side 132 may be mirror images of each other, and similar to the first end 126 and the second end 128, may include similar and/or identical components. In some examples, the symmetry of the first side 130 and the second side 132 may cause confusion for servicing the vehicle since identical components are located in the mirrored sides. Accordingly, uniquely identifying the first side 130 from the second side 132 may be useful for identifying components to service, replace, or otherwise interact with.

The first axis 102 and the second axis 104 divide the symmetrical vehicle 100 into quadrants. The quadrants may be similar and/or identical to one another, with adjacent quadrants mirror images of each other across the first axis 102 or the second axis 104. The quadrants may be indistinguishable from each other without any additional indicators. Therefore, in a service depot or other situation where a particular quadrant of the vehicle needs to be uniquely identified, for example to service a particular component in an error state, the indicators described herein can be used to uniquely identify a quadrant of the vehicle for various purposes.

The symmetrical vehicle 100 includes different light emitting devices or indicators, which are sometimes referred to as lamps, for various purposed. As used herein, the term "lamp" should be broadly understood to mean a visual indicator capable of emitting visible light, infrared light, ultraviolet light, or other electromagnetic radiation. For example, a first indicator 106A, second indicator (not shown in FIG. 1), third indicator 106C, and fourth indicator 106D (collectively "indicators 106") may serve to provide indications of quadrants of the symmetrical vehicle 100. Additional lamps or indicators may include headlamps 116, tail lamps, stop lamps, marker lamps 114, and other such lamps. Lamps for vehicle safety are required according to 49 CFR § 571.108-Lamps, reflective device, and associated equipment and specific requirements for those lamps are described according to the regulation. The regulation covers certain lamps on vehicles and dictates their placement, colors, and patterns. The lamps include lower beam headlamps, upper beam headlamps, turn signals, tail lamps, stop lamps, side markers, reflect reflectors, backup lamps, license plate lamps, parking lamps, high mounted stop lamps, daytime running lamps. Various specifications are provided that regulate the use of the lamps based on daytime and nighttime (and/or inclement weather), as well as event-based situations such as high beams, brakes, hazards, turn signals, reverse.

In contrast, the indicators 106A, 106C, 106D (collectively referred to as "indicators 106") are outside of the specified lamps, and may therefore present other options for colors, patterns, and indications than those specified for the existing lamps. For example, the indicators 106 may indicate a vehicle state while operational (e.g., on a mission, awaiting a passenger pickup, passenger drop-off, etc.). The indicators 106 may also provide information to observers related to error codes, service status, location of quadrants, driving modes, standby mode, charge status of a batter, driving direction, and other such information.

The indicators 106 may be controlled by light controllers 124A and 124B. The light controllers 124A and 124B may control operations of one or more of the lamps on the exterior and/or interior of the symmetrical vehicle 100. For example, the light controllers 124A and 124B may control the headlamps 116 to project light as headlamps at a front of the symmetrical vehicle 100 and to project red brake lights at the rear. Because of the symmetrical nature of the vehicle, the headlamps 116 may switch between serving as headlamps and serving as tail lamps for the symmetrical vehicle 100. The light controllers 124A and 124B may also control the indicators 106 to display the information described herein, including uniquely identifying a quadrant of the symmetrical vehicle 100, identifying error codes, status information, and other such information.

In some examples, the light controllers 124A and 124B may be identical and/or nearly identical to one another and may be coupled redundantly to the lamps of the symmetrical vehicle 100. In this manner the light controllers 124A and 14B may each independently control each of the lamps, providing redundancy. In some examples, additional light controllers may be coupled to the lamps. For example, a symmetrical vehicles 100 there may be four light controllers, one for each quadrant of the symmetrical vehicle 100. In some examples the light controllers 124A and 124B may control particular lamps, such as a first controller managing operation of exterior lamps while a second controller manages operation of interior lamps. In operation, each of the light controller may configure itself to operate within a position based on indicators of a specific position (e.g., a specific light configuration is detected as being coupled to the controller, a specific pin configuration of a connector (such as via dedicated configuration pins comprising a pattern of shorts, opens, shorts to ground, or shorts to a voltage level), or via assignment by another vehicle controller based on detecting the position of the light controller).

In some examples, the light controllers 124A and 124B may be a single component that controls all of the lamps of the vehicle. In some examples, the light controllers 124A and 124B may control lights at the first end 126 and the second end 128 of the vehicle, respectively. Similarly, in some examples, the light controllers 124A and 124B may control lamps at the first side 130 and the second side 132. The light controllers 124A and 124B may be in communication with the computer system(s) 118 of the symmetrical vehicle 100. For example, the light controllers 124A and 124B may communicate over a communication network of the symmetrical vehicle 100 according to instructions provided from the computer system(s) 118. The computer system(s) 118 may include one or more processor(s) 120 and one or more memory devices 122. The processor(s) 120 may execute instructions from the memory devices 122 and/or received over a network in communication with the computer system(s) 118 to cause the light controllers 124A and 124B to control light output of the lamps as described herein.

In some examples, the indicators 106 may be augmented by output from audio devices 112. The audio devices 112 may be used to project data from respective quadrants of the symmetrical vehicle 100 and/or to provide additional information related to the status or operation of the symmetrical vehicle 100. In an example, the audio devices 112 may output a tone to accompany a flashing indicator 106 identifying a particular quadrant of the symmetrical vehicle 100, thereby drawing attention to the location of the quadrant for one or more purposes.

Figure 2:
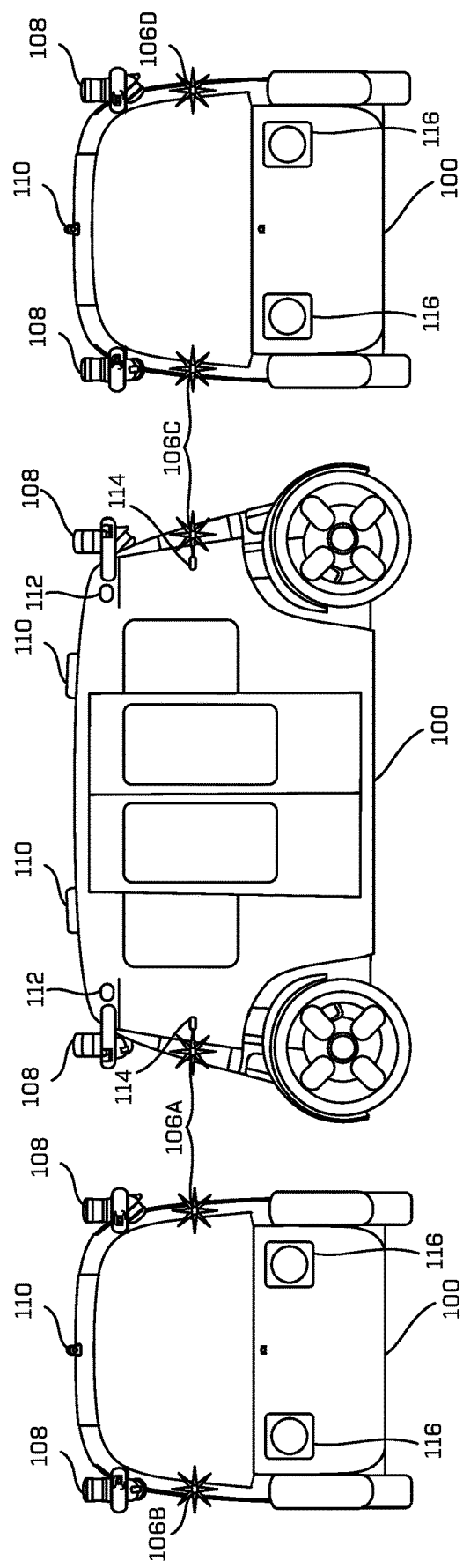
FIG. 2 illustrates a symmetrical vehicle showing illuminated indicator lights used to identifying quadrants of the symmetrical vehicle while in an operation mode or in a service mode, according to at least one example.

FIG. 2 illustrates a symmetrical vehicle 100 showing illuminated indicator lights used to identifying quadrants of the symmetrical vehicle 100 while in an operation mode or in a service mode, according to at least one example. The symmetrical vehicle 100 includes the components described above with respect to FIG. 1. The indicators 106 are shown illuminated in FIG. 2, with all four indicators 106A, 106B, 106C, and 106D illuminated. In some examples, FIG. 2 may illustrate illumination of the indicators 106 during operation of the vehicle, with the indicators illuminated to show an operational status, such as green to indicate the symmetrical vehicle 100 is in an operational mode. In some examples, the illumination may use a color to reflect the charge status of a battery of the symmetrical vehicle 100, with a color such as orange or orange-red used to indicate a low charge status for a battery of the vehicle. In some examples, the illumination of the indicators 106 may reflect the mode of operation for the symmetrical vehicle 100, for example to illustrate whether the vehicle is performing a mission, driving to a destination for a passenger pickup, waiting for a passenger to enter and/or exit, or other operational status.

Figure 3:
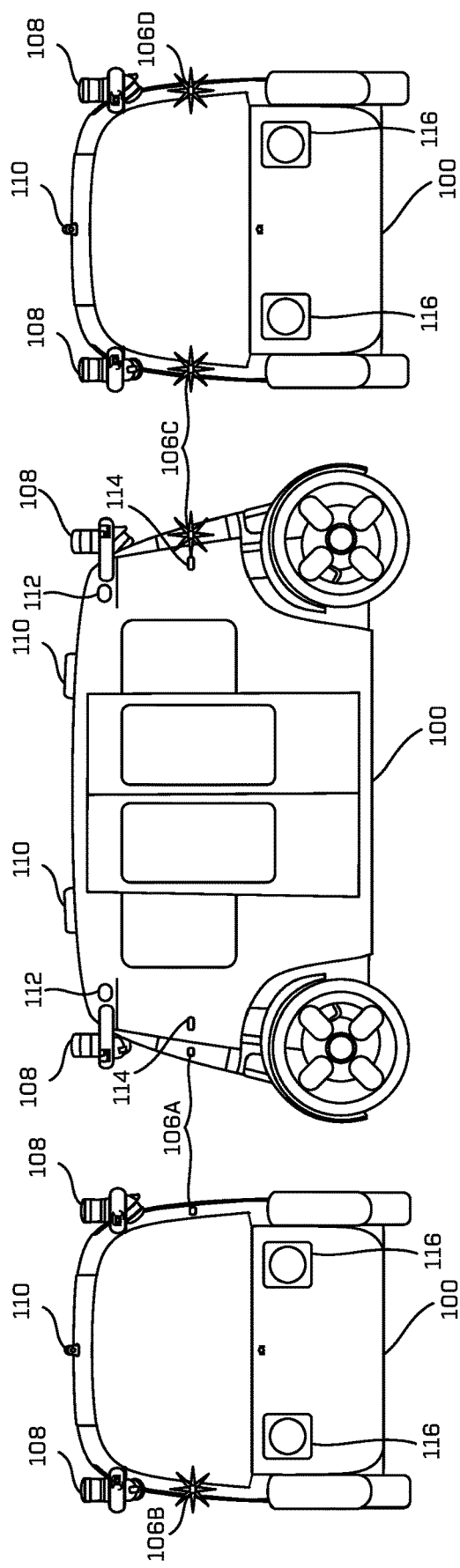
FIG. 3 illustrates a symmetrical vehicle showing illuminated indicator lights used to identify quadrants of the symmetrical vehicle while in an operation mode or in a service mode, according to at least one example.

In some examples, FIG. 2 may show a state of the indicators of the symmetrical vehicle 100 at a first time, with FIG. 3 illustrating a state of the indicators at a second time. FIG. 3 illustrates a symmetrical vehicle 100 showing illuminated indicator lights used to identify quadrants of the symmetrical vehicle 100 while in an operation mode or in a service model, according to at least one example. In the example of FIG. 3, the symmetrical vehicle 100 is shown with the indicator 106A shut off while the other indicators are illuminated. This may uniquely identify the quadrant including indicator 106A as a first quadrant, or quadrant of interest for one or more purposes. In some examples, the indicators 106 may alternate between the illumination shown in FIG. 2 and the illumination shown in FIG. 3 in some examples. For instance, when the symmetrical vehicle 100 enters a service depot, the indicators 106 may begin to alternate between those shown in FIG. 2 and shown in FIG. 3, such that indicator 106A is flashing while the other indicators 106B, 106C, and 106D are steady. This may be used to uniquely identify the quadrant with indicator 106A for service purposes. For example, a service technician may identify the quadrant for servicing a component within that quadrant. In some examples, the quadrant may be identified to provide an orientation to understand an alignment of the symmetrical vehicle 100 in the physical world with a representation of the vehicle that may exist on a computing device of the service depot. For example, when entering the service depot, the symmetrical vehicle 100 may communicate with a computing device over a network to communicate any service codes (indicating required or recommended service), error codes, fault codes, or items reported as needing attention by a service technician. The computing device may provide a display of the symmetrical vehicle 100 represented on a display device for viewing by a service technician. The service technician may then note the orientation of the representation of the symmetrical vehicle 100 on the display and in the physical space to identify which components or quadrants of the symmetrical vehicle 100 require attention.

In some examples, the indicators 106 may flash or sequence in other patterns, such as shown and described with respect to FIG. 5 below. In some examples, the quadrant identified for attention may, for example, have a steady illuminated indicator 106 while other quadrants have associated indicators that are either in an off mode or flashing. This distinction enables unique identification of the quadrants of the symmetrical vehicle 100 for purposes such as service.

Figure 4:
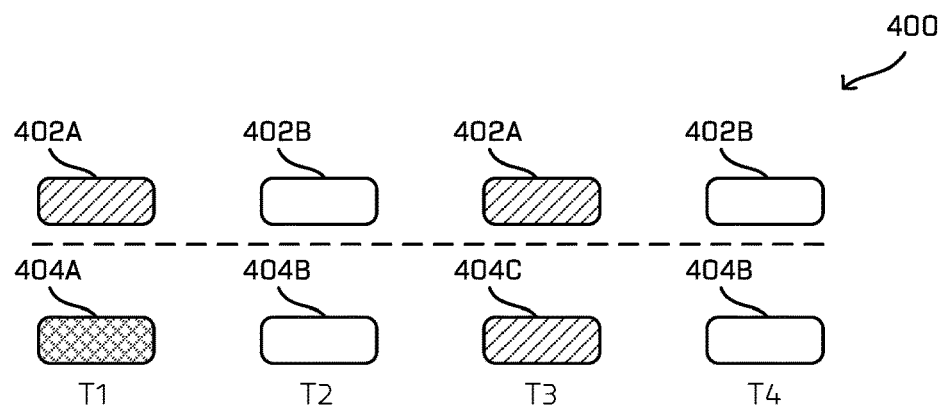
FIG. 4 illustrates an example indicator light in a quadrant of a vehicle that may be configured to display different colors to convey varying messages regarding the status of the symmetrical vehicle, according to at least one example.

FIG. 4 illustrates an example of indicator lights 400 in a quadrant of a vehicle that may be configured to display different colors or patterns to convey varying messages regarding the status of the symmetrical vehicle, according to at least one example. The indicator lights 400 are shown over periods of time (T1-T4) to illustrate illumination and flashing patterns for the indicator lights.

In a first example, the first indicator light 402A is shown illuminated with a first color at a first time. At a second time, the first indicator light 402B is no longer illuminated. At a third time, the first indicator light 402A is illuminated with the first color. At a fourth time, the first indicator light 402B is illuminated with the first color. In some examples, the color may indicate an additional parameter associated with the quadrant. For instance, the flashing indicator light may be used to identify a quadrant and may also convey information related to the status of the quadrant and/or the vehicle as a whole. In an example, the first indicator light 402A may be illuminated red to indicate a fault or error in the quadrant. In an example, the first indicator light 402A may be illuminated green to indicate that the vehicle is in an operational mode. In an example, the first indicator light 402A may be illuminated yellow or orange to indicate the vehicle is in a service mode. In some examples, the indicators at the four quadrants of the symmetrical vehicle 100 may be illuminated in different colors to indicate different status information about the symmetrical vehicle.

In a second example, a second color is used to illuminate the second indicator light 404A. The second indicator light 404A may be illuminated at a first time. At a second time, the second indicator light 404B may not be illuminated. At a third time, the second indicator light 404C is illuminated, but with a color different from the first color. In this manner, multiple different pieces of information may be conveyed through the indicators. For example, the second indicator light 404A may use a color indicative of a service status of the symmetrical vehicle 100, such as yellow to indicate the symmetrical vehicle 100 is in a service mode. The second indicator light 404C may use a second color to indicate information particular to the specific quadrant. For example, a red color may indicate that a fault is occurring within the specified quadrant. In this manner, the indicators may be used to relay multiple different types of information to a service technician.

Figure 5:
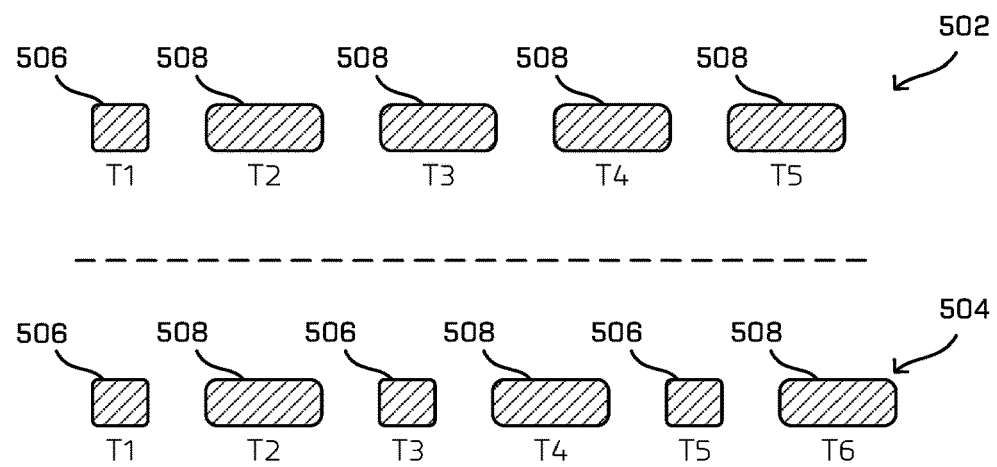
FIG. 5 illustrates example light patterns for an indicator light of a symmetrical vehicle that may be used to indicate a status of the symmetrical vehicle, according to at least one example.

FIG. 5 illustrates example light patterns for an indicator 106 of a symmetrical vehicle 100 that may be used to indicate a status of the symmetrical vehicle 100, according to at least one example. The example light patterns may indicate reflect patterns and time intervals (T1-T6) for activating and deactivating the indicators 106 in one or more quadrants of the symmetrical vehicle 100.

In a first example 502, the indicators 106 may activate in a first pattern that begins with a first illumination 506 over a first period of time followed by a period of time when the indicators 106 are switched off. A second illumination 508 over a second period of time occurs after the first illumination 506. The second period of time may be longer than the first period of time such that the example light patterns may be used to convey information using a pattern similar to and/or identical to morse code or some other code. In some examples, one of the first illumination 506 and/or the second illumination 508 may repeat.

In a second example 504, the indicators 106 may activate in a second pattern that alternates between the first illumination 506 and the second illumination 508. The repeating pattern of the second example 504 may be used to indicate one or more statuses of the symmetrical vehicle 100 and/or a quadrant of the symmetrical vehicle 100 as described herein.

FIGS. 6-13 illustrate a top view of a symmetrical vehicle 100 as described with respect to FIG. 1 as well as a grid showing a representation of the illumination of indicators 106 over a period of time. The period of time is divided, in the example, into eight discrete segments of time. In some examples, the segments of time may be of equal length. In some examples, the segments of time may be of varying length.

The representation grid shows statuses of the indicators 106 in the four quadrants of the symmetrical vehicle 100. In the representation grid, Q1, Q2, Q3, and Q4 represent four quadrants of the symmetrical vehicle 100 as defined by the first axis 102 and the second axis 104.

Figure 6:
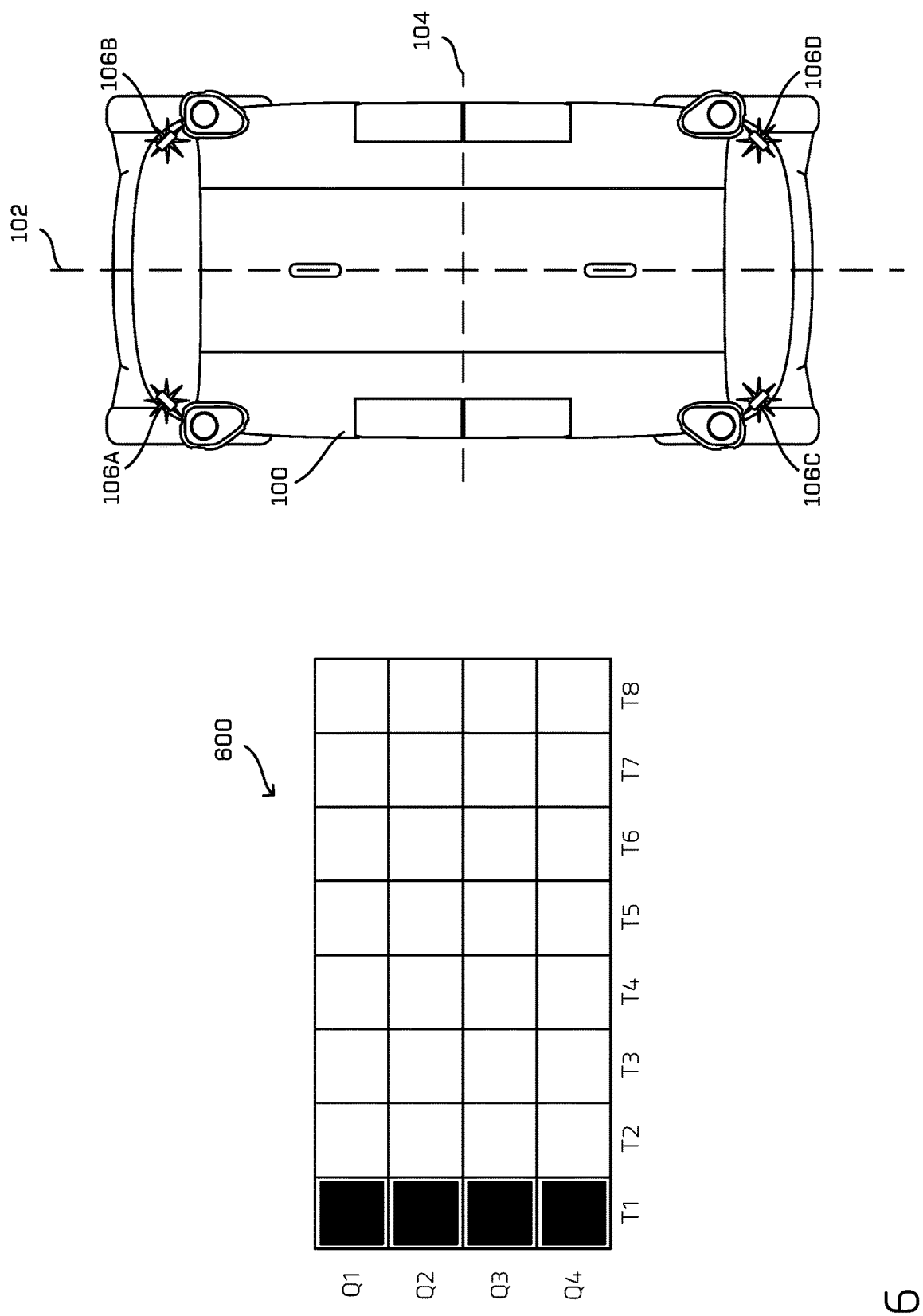
FIG. 6 illustrates a top view of a symmetrical vehicle and a representation of indicator lights used to indicate a status of the symmetrical vehicle at a first time, according to at least one example.

FIG. 6 illustrates a top view of the symmetrical vehicle 100 and a representation grid 600 of indicators 106 used to indicate a status of the symmetrical vehicle 100 at a first time, according to at least one example. At the first time, each of the indicators 106 are shown illuminated on the symmetrical vehicle, and the representation grid 600 shows illumination across each of the quadrants. In some examples, the first time may indicate an operational status of the vehicle, such as being in an autonomous mode and/or entering a service mode.

Figure 7:
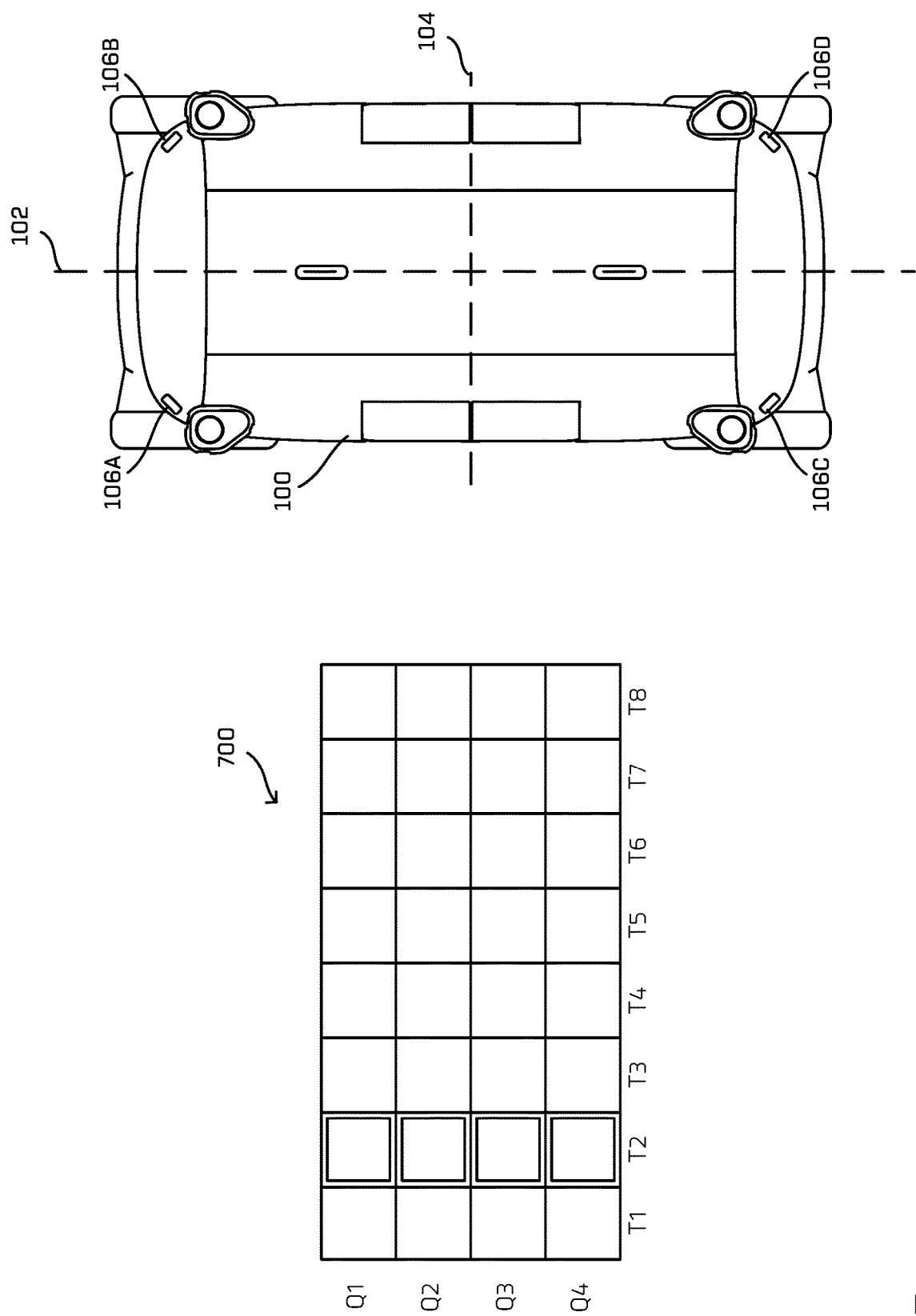
FIG. 7 illustrates a top view of a symmetrical vehicle and a representation of indicator lights used to indicate a status of the symmetrical vehicle at a second time, according to at least one example.

FIG. 7 illustrates a top view of the symmetrical vehicle 100 and a representation grid 700 of indicators 106 used to indicate a status of the symmetrical vehicle 100 at a second time, according to at least one example. At the second time, none of the indicators 106 are shown illuminated. This may be part of a repeating pattern of illuminating and turning off the indicators 106 to illustrate and/or represent the operational status of the vehicle.

Figure 8:
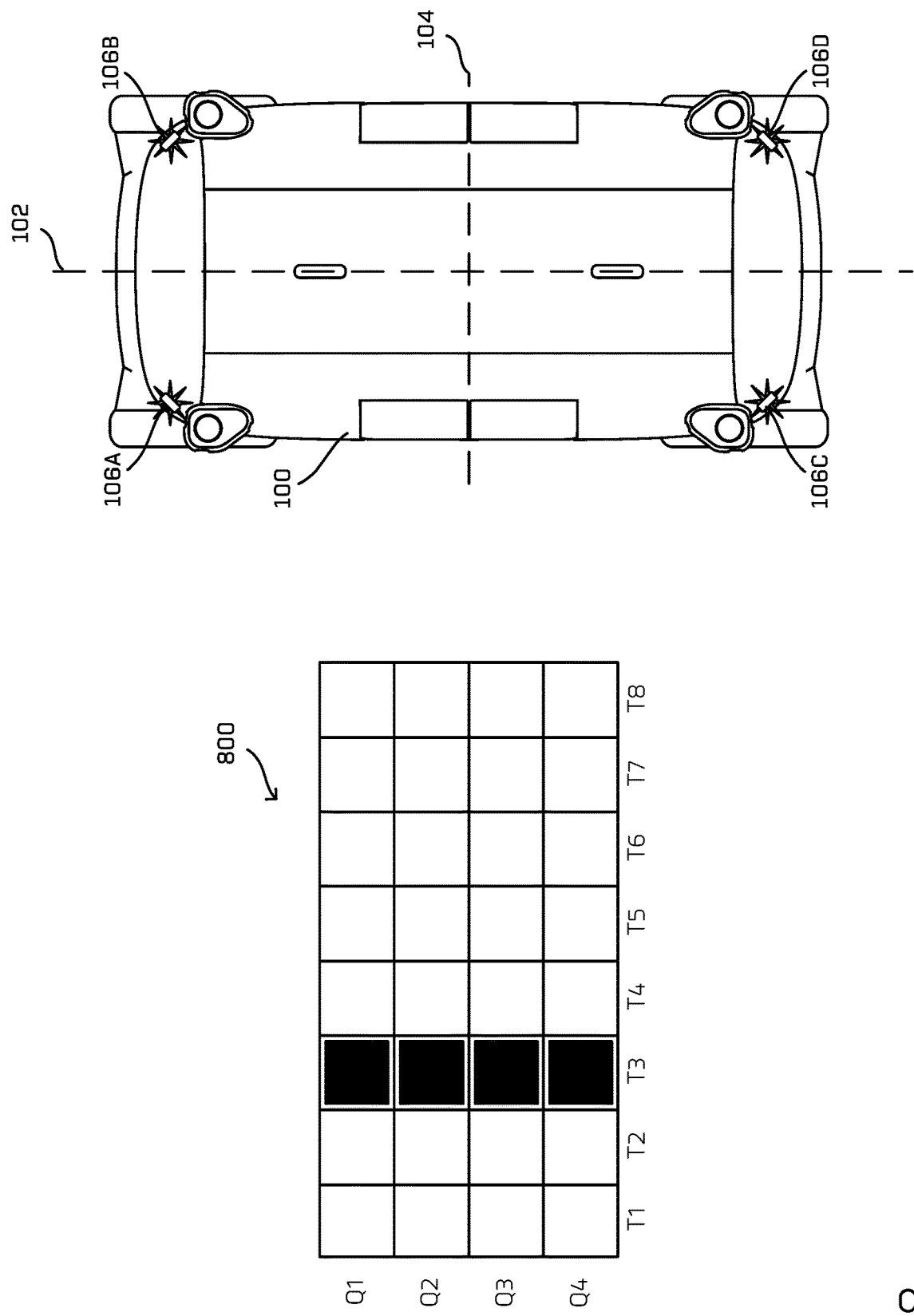
FIG. 8 illustrates a top view of a symmetrical vehicle and a representation of indicator lights used to indicate a status of the symmetrical vehicle at a third time, according to at least one example.

FIG. 8 illustrates a top view of the symmetrical vehicle 100 and a representation grid 800 of indicators 106 used to indicate a status of the symmetrical vehicle 100 at a third time, according to at least one example. At the third time, each of the indicators 106 are shown illuminated on the symmetrical vehicle, and the representation grid 800 shows illumination across each of the quadrants. In some examples, the third time may indicate an operational status of the vehicle, such as being in an autonomous mode and/or entering a service mode. This may be part of a repeating pattern of illuminating and turning off the indicators 106 to illustrate and/or represent the operational status of the vehicle.

Figure 9:
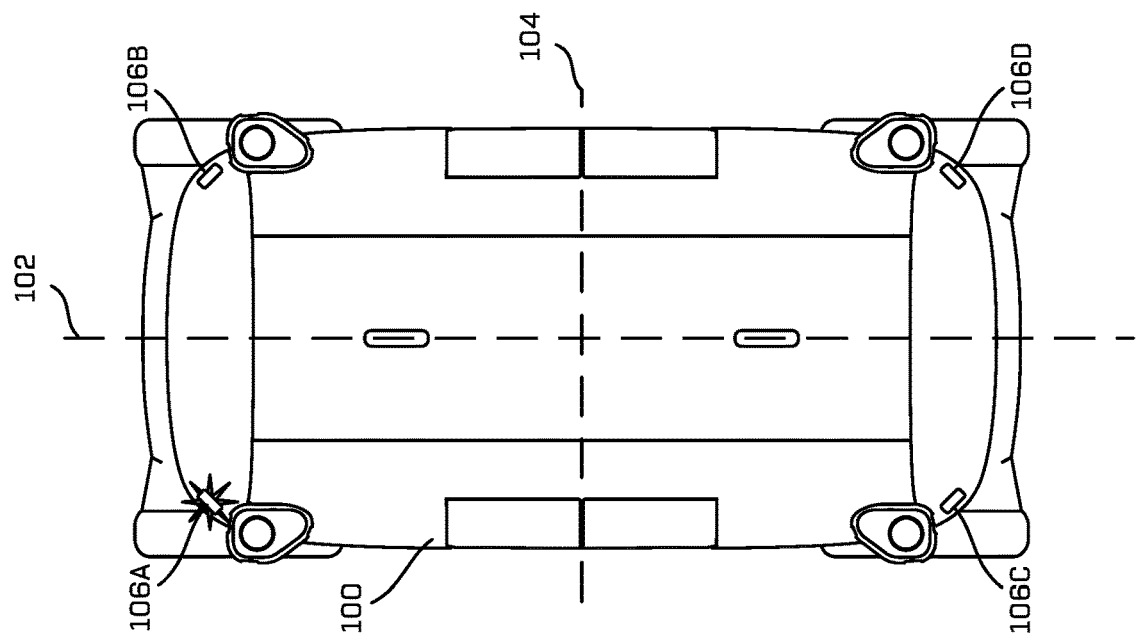
FIG. 9 illustrates a top view of a symmetrical vehicle and a representation of indicator lights used to indicate a status of the symmetrical vehicle at a fourth time, according to at least one example.
Figure 9:
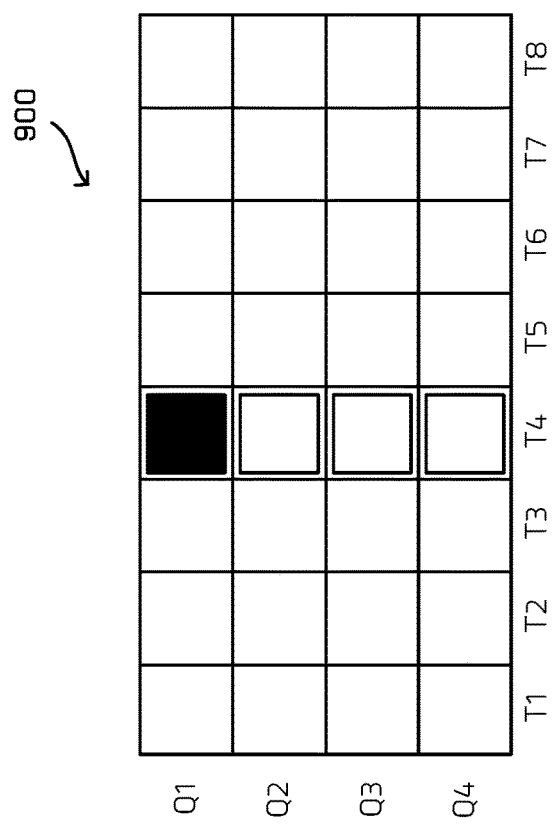

FIG. 9 illustrates a top view of the symmetrical vehicle 100 and a representation grid 900 of indicators 106 used to indicate a status of the symmetrical vehicle 100 at a fourth time, according to at least one example. At the fourth time, the symmetrical vehicle 100 may enter a service depot and may show an indication of the first quadrant of the symmetrical vehicle 100 for service purposes. In some examples, the indication of the first quadrant may be a quadrant having a fault or error. In some examples, the indication of the first quadrant may be used to orient a service technician to align a display from a computer device against the symmetrical vehicle 100.

Figure 10:
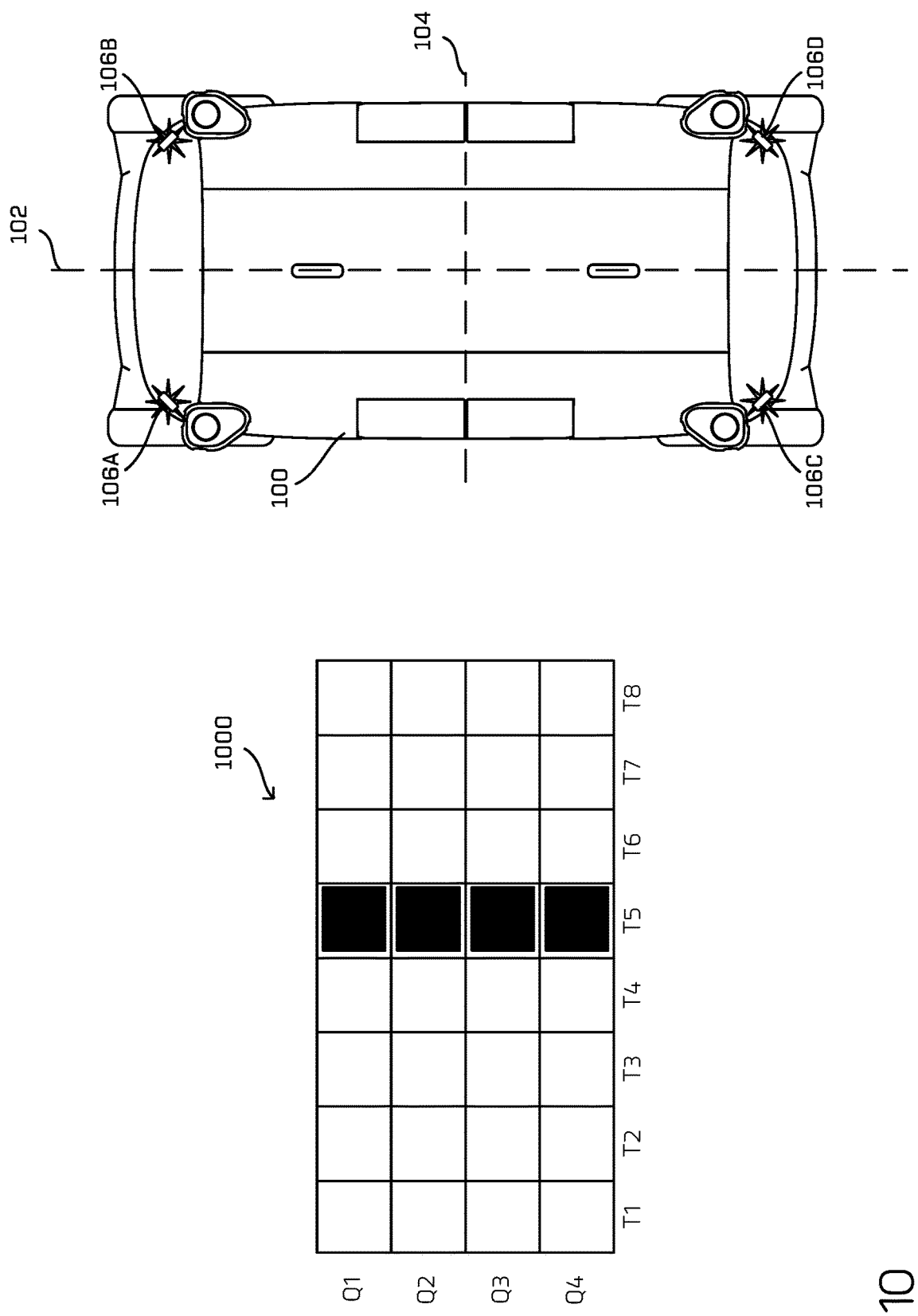
FIG. 10 illustrates a top view of a symmetrical vehicle and a representation of indicator lights used to indicate a status of the symmetrical vehicle at a fifth time, according to at least one example.

FIG. 10 illustrates a top view of the symmetrical vehicle 100 and a representation grid 1000 of indicators 106 used to indicate a status of the symmetrical vehicle 100 at a fifth time, according to at least one example. The indicators 106 may flash or illuminate in the alternating pattern shown in FIGS. 6-10 to present information to the service technician and/or an observer regarding the status of the vehicle and the orientation of the vehicle within the service depot.

Figure 11:
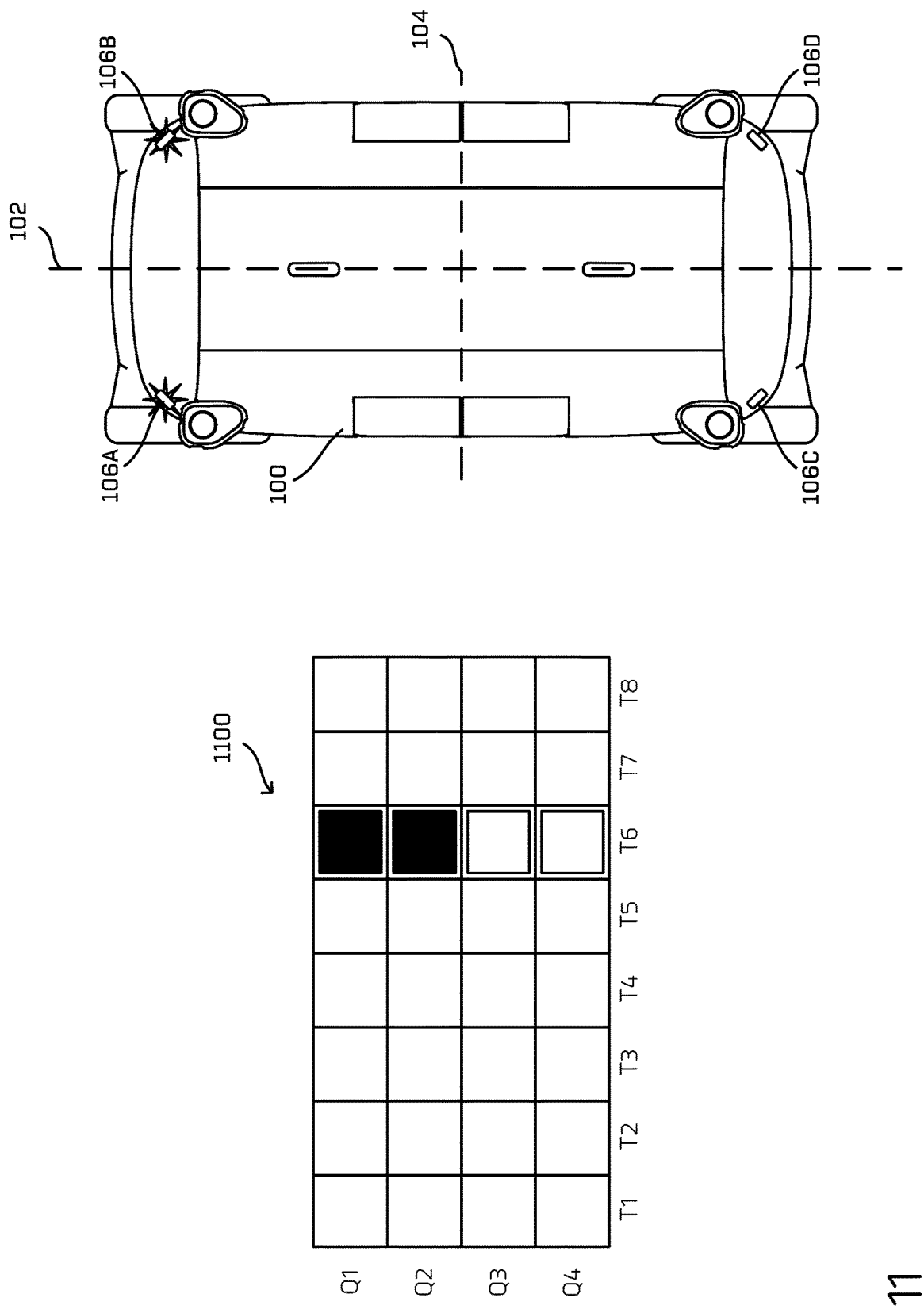
FIG. 11 illustrates a top view of a symmetrical vehicle and a representation of indicator lights used to indicate a status of the symmetrical vehicle at a sixth time, according to at least one example.

FIG. 11 illustrates a top view of the symmetrical vehicle 100 and a representation grid 1100 of indicators 106 used to indicate a status of the symmetrical vehicle 100 at a sixth time, according to at least one example. At the sixth time, the symmetrical vehicle is showing indicators at a first end of the symmetrical vehicle 100 illuminated to indicate the orientation of the symmetrical vehicle 100. In some examples, rather than illustrating and uniquely identifying a quadrant, the indicators 106 may be used to identify a first end and/or a second end of the symmetrical vehicle 100.

Figure 12:
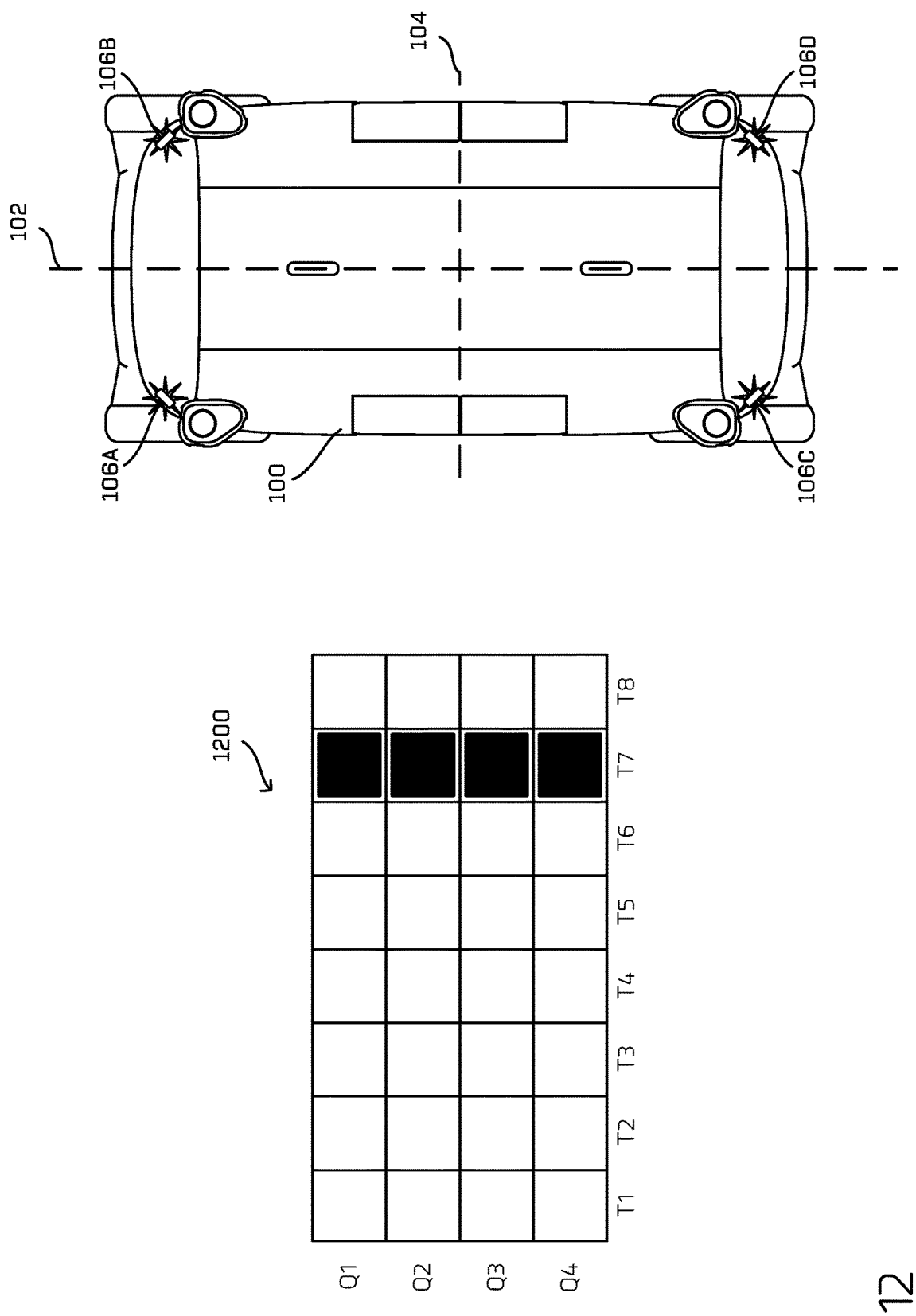
FIG. 12 illustrates a top view of a symmetrical vehicle and a representation of indicator lights used to indicate a status of the symmetrical vehicle at a seventh time, according to at least one example.

FIG. 12 illustrates a top view of the symmetrical vehicle 100 and a representation grid 1200 of indicators 106 used to indicate a status of the symmetrical vehicle 100 at a seventh time, according to at least one example. The indicators 106 may flash or illuminate in the alternating pattern shown in FIGS. 6-12 to present information to the service technician and/or an observer regarding the status of the vehicle and the orientation of the vehicle within the service depot.

Figure 13:
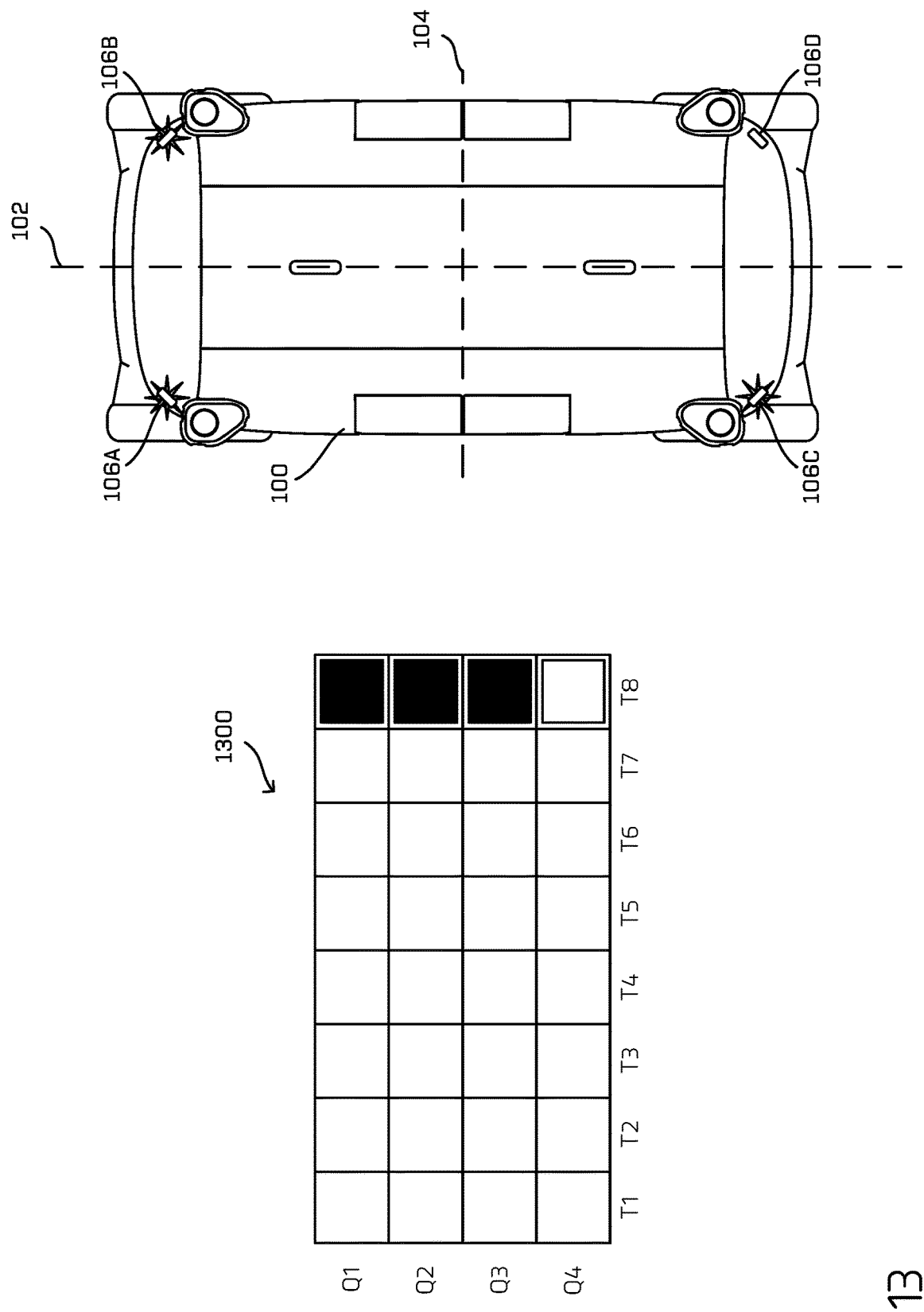
FIG. 13 illustrates a top view of a symmetrical vehicle and a representation of indicator lights used to indicate a status of the symmetrical vehicle at an eighth time, according to at least one example.

FIG. 13 illustrates a top view of the symmetrical vehicle 100 and a representation grid 1300 of indicators 106 used to indicate a status of the symmetrical vehicle 100 at an eighth time, according to at least one example. At the eighth time, the symmetrical vehicle 100 may flash illumination of indicators 106 for three of the four quadrants to indicate and/or orient the symmetrical vehicle 100 according to the quadrant that remains unilluminated rather than illuminated, as shown in FIG. 9.

Figure 14:
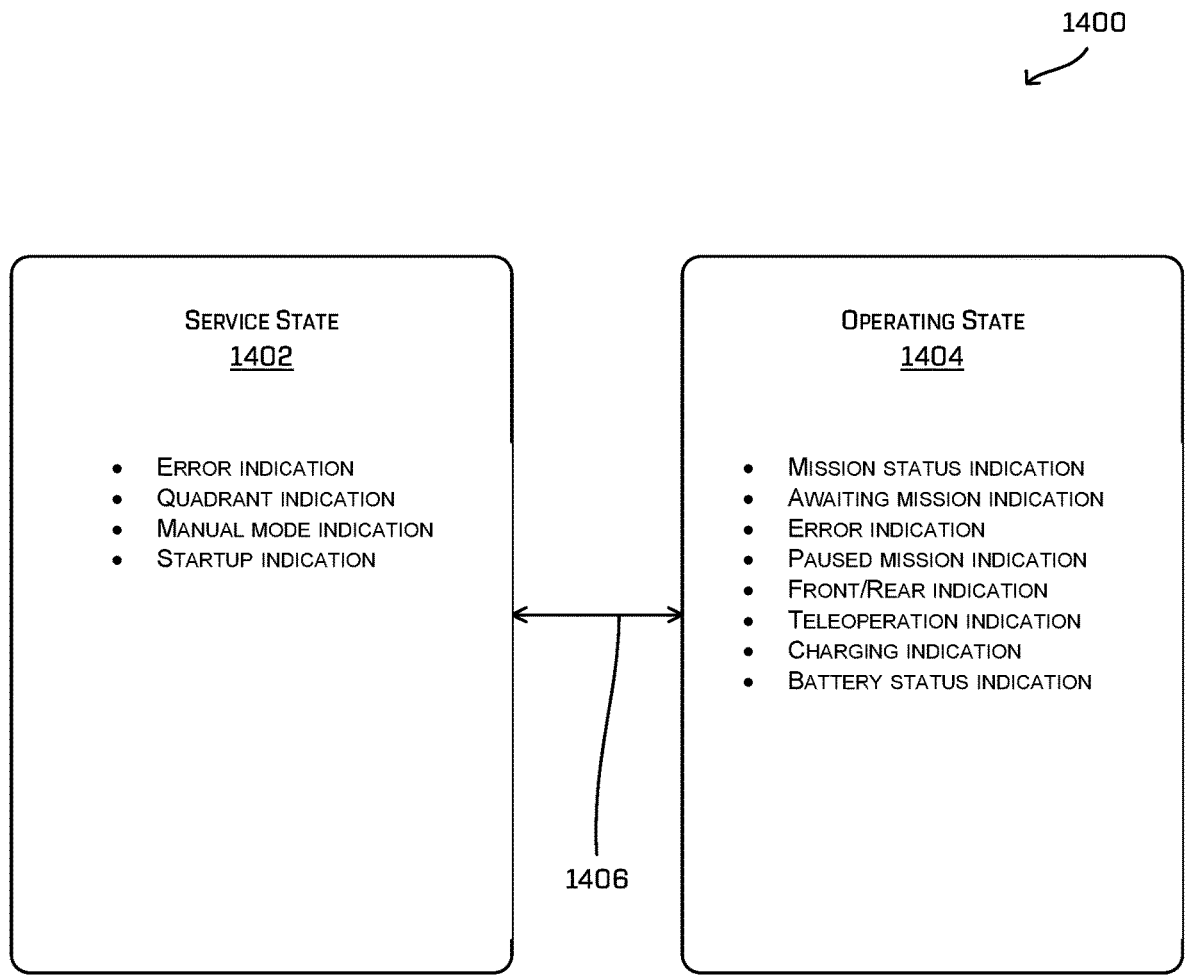
FIG. 14 illustrates an example state diagram depicting states for a symmetrical vehicle that may have corresponding status indicators, according to at least one example.

FIG. 14 illustrates an example state diagram 1400 depicting states for a symmetrical vehicle that may have corresponding status indicators, according to at least one example. The state diagram 1400 includes a service state 1402 and an operating state 1404 for a symmetrical vehicle, such as described herein. The state diagram 1400 also includes a transition 1406 between the state modes. Though the state diagram 1400 is only shown to include two states for the symmetrical vehicle, in some examples additional states may exist and additional transitions may provide for changing the state of the vehicle between various states. In the service state 1402 and the operating state 1404, the indicators of the symmetrical vehicle may operate with different functionality to provide information to a viewer of the symmetrical vehicle based on the situation and state.

In the service state 1402, the symmetrical vehicle 100 may be within a service location, such as a service depot, or may have some error that requires error before proceeding, such as an error in a drive component. In such examples, the vehicle may be in a service state 1402 and the indicator lights may reflect information useful for the service state. For example, in the service state 1402, the indicator lights may be used to display error indications, such as error codes associated with components in fault, may be used to display quadrant locations either for determining a standard quadrant of the vehicle or to identify a quadrant where the error is located, or may indicate that the vehicle is in a manual operation mode and is navigated through the use of a manual driving interface rather than an autonomous or teleoperation interface. In some examples, the vehicle may be in a startup state with the indicator lights showing the vehicle is booting up but not yet ready to enter a standby mode. Accordingly, the indicator lights may operate as described herein for indicting such states or modes when within the service state 1402.

In the operating state 1404, the symmetrical vehicle 100 may be prepared for or currently operating in an environment. Accordingly, the indicator lights may present information related to the operation of the vehicle such as mission status information, standby or awaiting mission indications, error indications, mission pauses, front or rear of the vehicle, indication of teleoperations, a charging indication, and/or a battery status indication, among other modes. The indicator lights may operate with different patterns and/or colors when in the operating state 1404 than in the service state 1402.

The transition 1406 may cause the vehicle and/or the indicator lights to transition between the service state 1402 and the operating state 1404 and thereby change the types of information displayed and manner of displaying information using the indicator lights. In some examples the transition 1406 may be caused based on the vehicle being within a geofenced location, such as within a service depot. In some examples, the transition 1406 may be as a result of a transmitter or device in communication with the vehicle causing the vehicle or indicator lights to change state. For example, a user device at a service depot may be used to cause the transition 1406.

Figure 15:
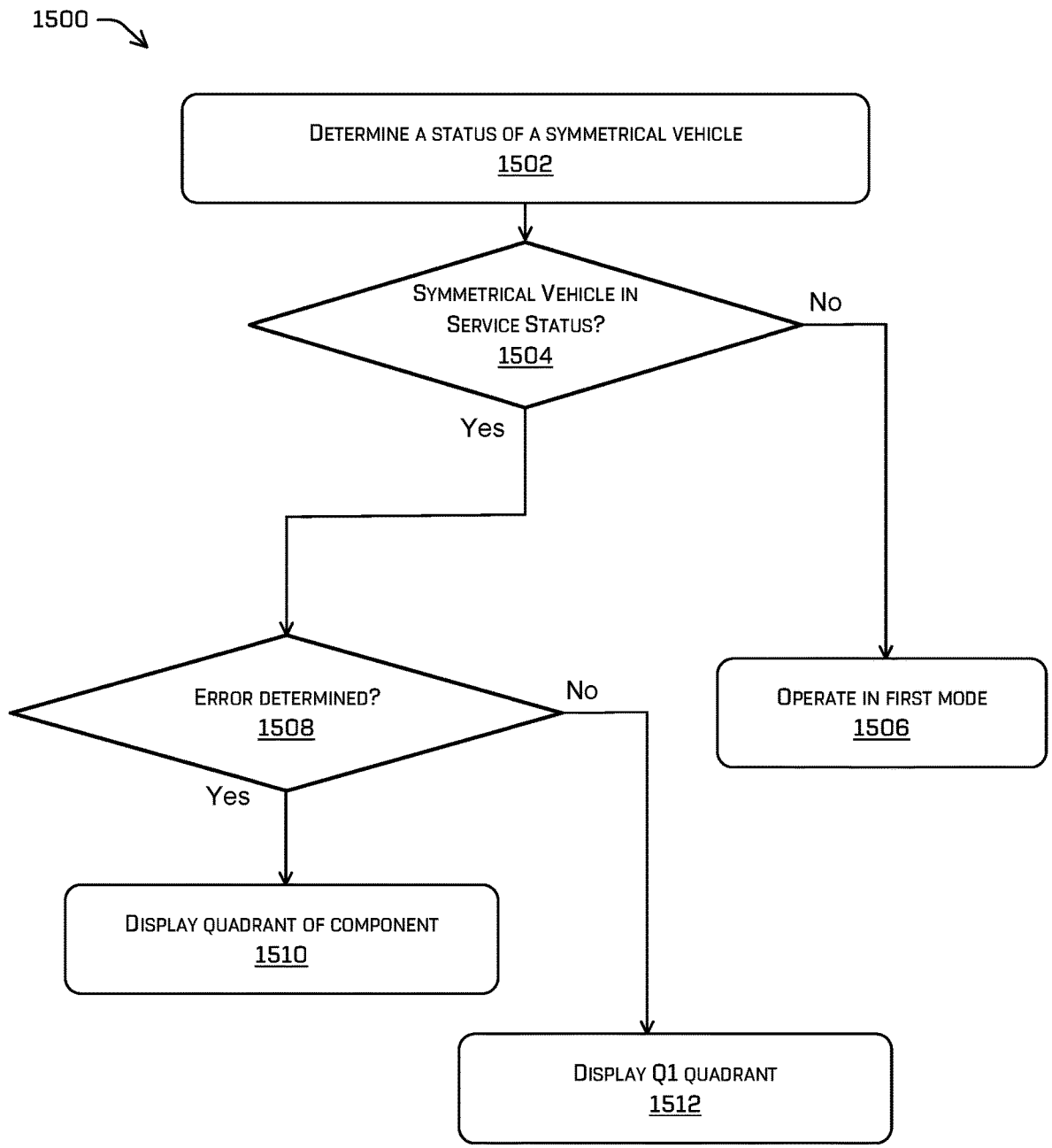
FIG. 15 illustrates a flow diagram depicting a process for indicating a status or quadrant of a symmetrical vehicle, according to at least one example.

FIG. 15 illustrates a flow diagram depicting a process 1500 for indicating a status or quadrant of a symmetrical vehicle, according to at least one example. In the process, the symmetrical vehicle 100 may be a symmetrical vehicle 100 as shown and described herein, such as in FIG. 1. The process 1500 may be performed in whole or in part using a computing device of the symmetrical vehicle. In some examples, one or more of the steps of the process 1500 may be performed by a computing device in communication with the symmetrical vehicle 100.

At 1502, the process 1500 includes determining a status of a symmetrical vehicle. The status may include an operational status, mode, error code, service status, or other such status of the symmetrical vehicle. In some examples, the status may be based on the operating state, such as whether the vehicle is performing a mission or awaiting instructions. In some examples, the status may be based on a location of the symmetrical vehicle. For example, the status may be based on the symmetrical vehicle being located within a service depot, a staging area, a charging depot, or other such location.

At 1504, the process 1500 includes determining whether the status of the vehicle is related to or associated with a service status. The status of the vehicle may be determined to be related to a service status when the status is associated with an error code, fault, charging status, service mode, or requirement to service one or more components of the vehicle.

At 1506, in the event that the vehicle is not in a service status, as determined at 1504, then the indicators of the symmetrical vehicle may operate in a first mode. The first mode may indicate a charge status, mission status, operational status, or other status of the vehicle while operating as an autonomous vehicle. The first mode may include a flashing and/or steady illumination of the indicators in one or more colors to indicate the operational mode of the symmetrical vehicle.

At 1508, the process 1500 includes determining whether a component of the symmetrical vehicle needs servicing or attention. For example, an error code associated with a particular component (e.g., a drive component, a braking component, a sensor component, or other component of the symmetrical vehicle) may be used to determine a component that requires servicing, including the location of the component within the symmetrical vehicle. The location of the component may include a quadrant where the component is located within the symmetrical vehicle.

At 1510, the process 1500 includes identifying a first quadrant of the symmetrical vehicle. The first quadrant may be identified for orienting a representation of the vehicle to the physical vehicle in the physical space. The first quadrant may be identified to enable a service technician or other operator to work on the symmetrical vehicle.

At 1512, the process 1500 includes identifying the quadrant of the vehicle where the component is located. The quadrant where the component is located may be identified using one or more techniques described herein, including illuminating one or more indicators 106 of the symmetrical vehicle 100 to identify the quadrant and/or provide information related to the component to be serviced and/or requiring attention on the vehicle.

Figure 16:
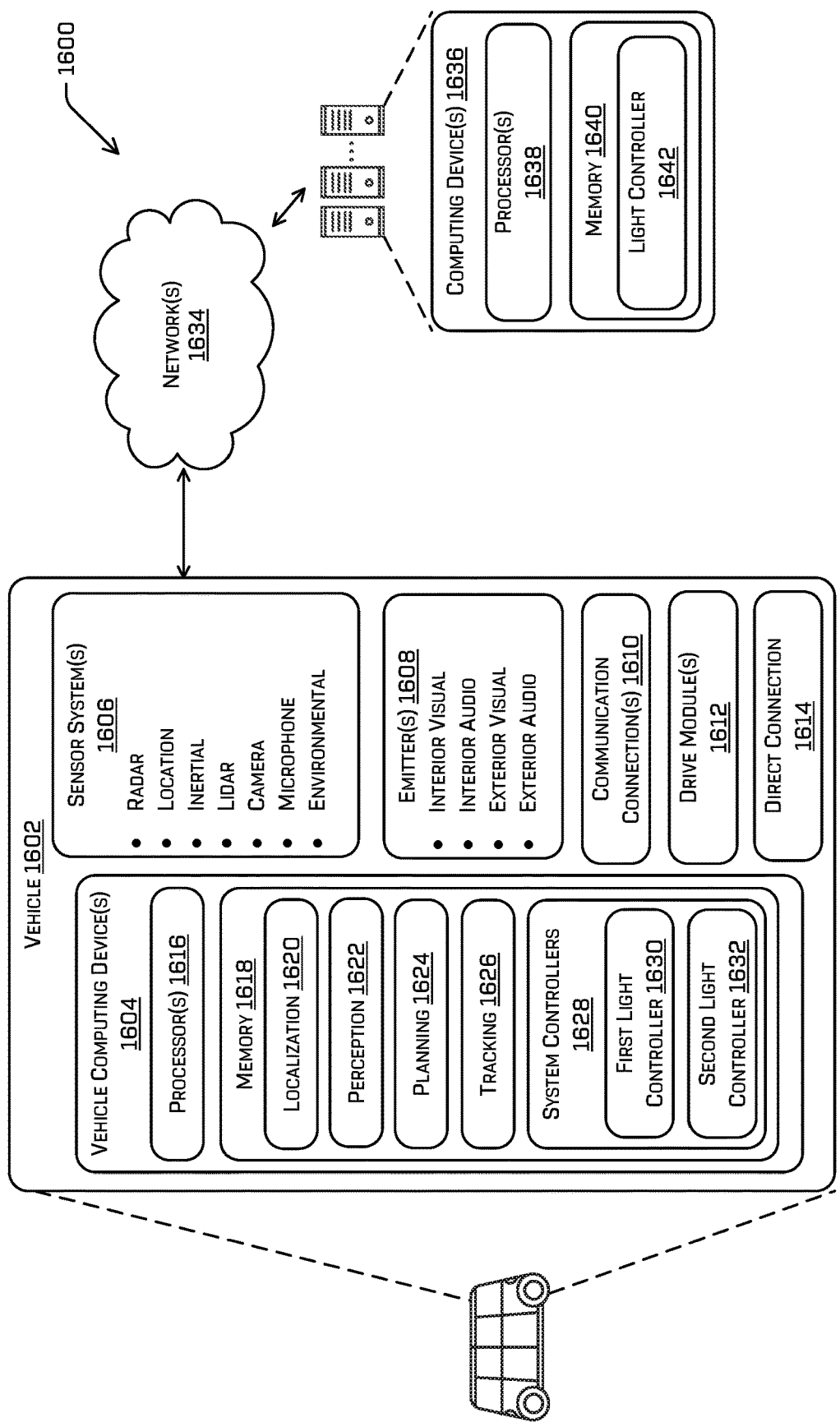
FIG. 16 illustrates an example block diagram of a system illustrating elements that may enable identification of a status of a symmetrical vehicle, according to at least one example.

FIG. 16 16 is a block diagram illustrating an example system 16 1600 for procedurally generating a simulated environment. In at least one example, a vehicle 16 1602 can include one or more vehicle computing device(s) 16 1604, one or more sensor system(s) 16 1606, one or more emitter(s) 16 1608, one or more communication connection(s) 16 1610, a direct connection 1614, and one or more drive module(s) 1612. For the purpose of illustration, the vehicle 1602 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 1602 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 1602 is an autonomous vehicle: however, the vehicle 1602 could be any other type of vehicle.

In at least one example, the vehicle 1602 can be a data collection device. In an additional or alternative example, the one or more components of the AI stack described above can be associated with the vehicle 1602. That is, the simulated environment described herein can be used to train, test, and/or validate one or more of the components described below with reference to vehicle 1602.

The vehicle computing device(s) 1604 can include processor(s) 1616 and memory 1618 communicatively coupled with the processor(s) 1616. In the illustrated example, the memory 1618 of the vehicle computing device(s) 1604 stores a localization system 1620, a perception system 1622, a planning system 1624, a tracking system 1626, and one or more system controllers 1628. Additionally, the memory 1618 can include a storage (not shown), which can store map(s), model(s), etc. A map can be any number of data structures modeled in two dimensions, three dimensions, or N dimensions that are capable of providing information about an environment, such as, but not limited to, topologies (such as intersections), streets, mountain ranges, roads, terrain, and the environment in general. Maps can be associated with real environments or simulated environments. Model(s) can include machine-trained models, as described below.

In at least one example, the localization system 1620 can determine a pose (e.g., a position and an orientation) of the vehicle 1602 in relation to a local and/or global map based at least in part on sensor data received from the sensor system(s) 1606 and/or map data associated with a map (e.g., of the map(s)). In at least one example, the localization system 1620 can include, or be associated with a calibration system that is capable of performing operations for calibrating (determining various intrinsic and extrinsic parameters associated with any one or more of the sensor system(s)

1606), localizing, and mapping substantially simultaneously. Additional details associated with such a system are described in U.S. Patent application Ser. No. 16/61,554,815, filed on Aug. 11, 2017, which is related to U.S. Patent application Ser. No. 16/6,154,853, filed on Aug. 11, 2017, the entire contents of both of which are incorporated by reference herein. As described above, the localization system 1620 can output road network data and/or a road mesh based on the sensor data received by the sensor system(s) 1606.

In at least one example, the perception system 1622 can perform object detection, segmentation, and/or classification based at least in part on sensor data received from the sensor system(s) 1606. In at least one example, the perception system 1622 can receive raw sensor data (e.g., from the sensor system(s) 1606). In other examples, the perception system 1622 can receive processed sensor data (e.g., from the sensor system(s) 1606). For instance, in at least one example, the perception system 1622 can receive data from a vision system that receives and processes camera data (e.g., images). In at least one example, the vision system can utilize one or more image processing algorithms to perform object detection, segmentation, and/or classification with respect to object(s) identified in an image. In some examples, the vision system can associate a bounding box (or other semantic information, such as an instance segmentation) with an identified object and can associate a confidence score associated with a classification of the identified object. In some examples, objects, when rendered via a display, can be colored based on their perceived class. In at least other examples, similar processes (detection, classification, segmentation, etc.) may be performed by the perception system 1622 for one or more other modalities (e.g., lidar, RADAR, ToF sensors, etc.).

The planning system 1624 can access sensor data from the sensor system(s) 1606, map data associated with a map (e.g., of the map(s) which can be in the storage), and/or perception data output from the perception system 1622 (e.g., processed sensor data), and can output predictions associated with one or more objects within the environment of the vehicle 1602. In at least one example, the planning system 1624 can determine routes and/or trajectories to use to control the vehicle 1602 based at least in part on sensor data received from the sensor system(s) 1606 and/or any determinations made by the perception system 1622. Additional details of localizer systems, perception systems, prediction systems, and/or planning systems that are usable can be found in U.S. Pat. No. 9,612,123, issued on Apr. 4, 2017, and U.S. patent application Ser. No. 16/632,208, filed Jun. 23, 2017, the entire contents of both of which are incorporated by reference herein. In some examples (e.g., where the vehicle 1602 is not an autonomous vehicle), one or more of the aforementioned systems and/or components can be omitted from the vehicle 1602. While the systems described above are illustrated as "onboard" the vehicle 1602, in other implementations, the systems can be remotely located and/or accessible to the vehicle 1602.

The tracking system 1626 can access sensor data from the sensor system(s) 1606 and track objects in the environment surrounding the vehicle. The tracking system 1626 may be used to track trajectories of objects and may be used in connection with the planning system 1624 to determine a route for the vehicle based on the tracking of objects in the environment.

In at least one example, the localization system 1620, the perception system 1622, the planning system 1624, and/or the tracking system 1626 can process sensor data, as described above, and can send their respective outputs over network(s) 1634, to computing device(s) 1636. In at least one example, the localization system 1620, the perception system 1622, the planning system 1624, and/or the tracking system 1626 can send their respective outputs to the computing device(s) 1636 at a particular frequency, after a lapse of a predetermined period of time, in near real-time, etc.

In at least one example, the vehicle computing device(s) 1604 can include one or more system controllers 1628, which can be configured to control steering, propulsion, braking, safety, emitters, communication, and other systems of the vehicle 1602. These system controllers 1628 can communicate with and/or control corresponding systems of the drive module(s) 1612 and/or other components of the vehicle 1602. In an example, the system controllers 1628 include a first light controller 1630 and a second light controller 1632 that may control light emitters as described herein, for example with the first light controller 1630 configured to control light emitters at a first end of the vehicle and the second light controller 1632 configured to control light emitters at a second end of the vehicle.

In at least one example, the sensor system(s) 1606, can include lidar sensors, radar sensors, ToF sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 1606 can include multiple instances of each of these or other types of sensors. For instance, the lidar sensors can include individual lidar sensors located at the corners, front, back, sides, and/or top of the vehicle 1602. As another example, the camera sensors can include multiple cameras disposed at various locations about the exterior and/or interior of the vehicle 1602. The sensor system(s) 1606 can provide input to the vehicle computing device(s) 1604. In some examples, the sensor system(s) 1606 can preprocess at least some of the sensor data prior to sending the sensor data to the vehicle computing device(s) 1604. In at least one example, the sensor system(s) 1606 can send sensor data, via the network(s) 1634, to the computing device(s) 1636 at a particular frequency, after a lapse of a predetermined period of time, in near real-time, etc.

The vehicle 1602 can also include one or more emitter(s) 1608 for emitting light and/or sound, as described above. The emitter(s) 1608 in this example include interior audio and visual emitters to communicate with passengers of the vehicle 1602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 1608 can be disposed at various locations about the exterior and/or interior of the vehicle 1602.

The vehicle 1602 can also include communication connection(s) 1610 that enable communication between the vehicle 1602 and other local or remote computing device(s). For instance, the communication connection(s) 1610 can facilitate communication with other local computing device(s) on the vehicle 1602 and/or the drive module(s) 1612. Also, the communication connection(s) 1610 can allow the vehicle to communicate with other nearby computing device(s) (e.g., other nearby vehicles, traffic signals, etc.). The communications connection(s) 1610 also enable the vehicle 1602 to communicate with a remote teleoperations computing device or other remote services.

The communications connection(s) 1610 can include physical and/or logical interfaces for connecting the vehicle computing device(s) 1604 to another computing device or a network, such as network(s) 1634. For example, the communications connection(s) 1610 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 1614 can directly connect the drive module(s) 1612 and other components of the vehicle 1602.

In at least one example, the vehicle 1602 can include drive module(s) 1612. In some examples, the vehicle 1602 can have a single drive module. In at least one example, if the vehicle 1602 has multiple drive module(s) 1612, drive module(s) 1612 can be positioned on opposite ends of the vehicle 1602 (e.g., the front and the rear, etc.). In at least one example, the drive module(s) 1612 can include sensor system(s) to detect conditions of the drive module(s) 1612 and/or the surroundings of the vehicle 1602. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive module(s) 1612. In some cases, the sensor system(s) on the drive module(s) 1612 can overlap or supplement corresponding systems of the vehicle 1602 (e.g., sensor system(s) 1606).

The drive module(s) 1612 can include many of the vehicle systems, including a high voltage battery, a motor to propel the vehicle 1602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 1612 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 1612. Furthermore, the drive module(s) 1612 also include communication connection(s) that enable communication by the respective drive module with other local or remote computing device(s).

In some examples, the vehicle computing device(s) 1604, sensor system(s) 1606, emitter(s) 1608, and the communication connection(s) 1610 can be implemented outside of an actual vehicle, for instance, as a simulated vehicle or as simulated systems, for use in "traversing" a simulated environment. That is, the vehicle computing device(s) 1604, sensor system(s) 1606, emitter(s) 1608, and the communication connection(s) 1610 can be used as a simulated autonomous vehicle for simulation purposes as described above.

As described above, the vehicle 1602 can send sensor data to the computing device(s) 1636, via the network(s) 1634. In some examples, the vehicle 1602 can send raw sensor data to the computing device(s) 1636. In other examples, the vehicle 1602 can send processed sensor data and/or representations of sensor data to the computing device(s) 1636 (e.g., data output from the localization system 1620, the perception system 1622, the planning system 1624, and/or the tracking system 1626). In some examples, the vehicle 1602 can send sensor data to the computing device(s) 1636 at a particular frequency, after a lapse of a predetermined period of time, in near real-time, etc.

The computing device(s) 1636 can receive the sensor data (raw or processed) from the vehicle 1602 and/or one or more data collection devices (which can include other vehicles like vehicle 1602), as well as data from one or more third-party sources and/or systems. In at least one example, the computing device(s) 1636 can include processor(s) 1638 and memory 1640 communicatively coupled with the processor(s) 1638. In the illustrated example, the memory 1640 of the computing device(s) 1636 stores a light controller 1642 that may be used to control the light emitters of the vehicle, for example while in a service depot, to cause the indicator lights of the vehicle to display particular information related to the status of the vehicle 1602. In some examples, one or more of the systems and/or storage repositories can be associated with the vehicle 1602 instead of, or in addition to, being associated with the memory 1640 of the computing device(s) 1636.

As described above, simulated environments can be useful for enhancing training, testing, and/or validating systems (e.g., one or more components of an AI stack) onboard an autonomous vehicle, such as vehicle 1602. In at least one example, simulated environments can be useful for training data models where training data from real environments is insufficient (e.g., as is the case with rare objects, rare scenarios, etc.). In such examples, a resulting data model can be provisioned to, or accessible by, the vehicle 1602, and the vehicle 1602 can utilize the data model for classifying objects in real-time (e.g., while driving or otherwise operating in the real environment). That is, the perception system 1622 can utilize the data model (trained based on simulated data associated with a simulated environment) onboard in near real-time to classify objects.

As a non-limiting example, training data from real environments is insufficient for training the vehicle 1602 to recognize rare events/objects (e.g., traffic lights types that are not frequently seen). In at least one example, by comparing simulated environments with real environments, the data model can learn that particular parameters matter for training a traffic light classifier. For instance, such parameters can include bulb discoloration, shading, lens distortion, dirt on the light, a burnt-out filament, variation in brightness, bulb rotation, bulb intensity, etc. Based on identifying the parameters, the training system can tune simulated environments associated with traffic lights and can train a traffic light classifier based on the tuned simulated environments. Such a classifier can be provisioned to, or accessible by, the vehicle 1602, and the vehicle 1602 can utilize the data model for classifying traffic lights in real-time. For instance, the perception system 1622 can utilize the classifier (trained based on simulated data used to generate a simulated environment) onboard in near real-time to classify traffic lights. That is, as described above, in at least one example, a classifier can be trained on simulated data and used for evaluating real data. In some examples, the classifier can be trained on real data and validated using simulated data. In such examples, identified discrepancies can be used to improve the classifier. In at least some instances, such rare examples may be identified by training, for example, a traffic light detector based on simulated image data, running the detector on real data, and determining where detections were missed. Similarly, determining that simulated parameters are not correct may comprise training an algorithm (e.g., the same detector as above) on real data, running such a detector on simulated data, and detecting missed objects.

Furthermore, simulated environments can be useful for validating and/or updating a localization algorithm used by the localization system 1620. For instance, in real environments, GPS sensors experience positional drifts and may, as a result, accumulate error. Accordingly, to validate a localization algorithm that is used for localizing the vehicle 1602, the evaluating computing device(s) 1636 can use a simulated environment, where the pose of the vehicle 1602 is known at various times (including at all times) and evaluate the sensor data associated with a corresponding real environment to validate the localization algorithm (e.g., by relying on simulated poses as position and/or orientation ground truth). In such an example, the sensor system(s) 1606 can generate sensor data associated with the simulated environment and the sensor data can be analyzed by the perception system 1622. An output of the perception system 1622 (e.g., associated with a position in a real environment) can be validated in view of the sensor data associated with the corresponding position in the simulated environment. That is, the sensor data associated with a position in a simulated environment can serve as the ground truth for the corresponding position in the real environment. As an example, lidar data recorded in association with a simulated environment (e.g., where the pose of the vehicle 1602 is known) can be compared to lidar data recorded in association with a corresponding position in a real environment and the localization algorithm can be updated as appropriate. Furthermore, simulated environments can be useful for validating radar or other sensors of the sensor system(s) 1606. In some examples, simulated environments can offer ground truth data for calibrating sensors (e.g., of the sensor system(s) 1606). Other examples include but are not limited to validating rolling shutter in simulation, calibration (e.g., of one or more of intrinsics or extrinsics) of various sensors, and the like. As would be appreciated, the techniques described herein may be used in validation, calibration, training, etc. for various other systems, subsystems, etc.

The processor(s) 1616 of the vehicle 1602 and the processor(s) 1638 of the computing device(s) 1636 can be any suitable processor capable of executing instructions to process data and perform operations as described herein. By way of example and not limitation, the processor(s) 1616 and 1638 can comprise one or more Central Processing Units (CPUs), Graphics Processing Units (GPUs), or any other device or portion of a device that processes electronic data to transform that electronic data into other electronic data that can be stored in registers and/or memory. In some examples, associated circuits (e.g., ASICs, etc.), gate arrays (e.g., FPGAs, etc.), and other hardware devices can also be considered processors in so far as they are configured to implement encoded instructions.

Memory 1618 and 1640 are examples of non-transitory computer-readable media. Memory 1618 and 1640 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 16 is illustrated as a distributed system, in alternative examples, components of the vehicle 1602 can be associated with the computing device(s) 1636 and/or components of the computing device(s) 1636 can be associated with the vehicle 1602. That is, the vehicle 1602 can perform one or more of the functions associated with the computing device(s) 1636, and vice versa.

Example Clauses

A. A vehicle system, comprising: an autonomous vehicle chassis comprising: a drive train configured to cause the vehicle system to traveling in a direction: a body, which is substantially mirrored about a first axis and a second axis to define four quadrants, the first axis extending from a first end to a second end of the body and the second axis perpendicular to the first axis and extending laterally across a center of the body; and four indicator lights, arranged on an exterior of the body and each disposed in respective quadrants of the four quadrants; and non-transitory computer-readable media storing instructions that, when executed by at least one processor, cause the vehicle system to perform acts comprising: determining that the vehicle system is in a service status or an operating status: causing the four indicator lights to illuminate in a first mode based at least in part on determining that the vehicle system is in the operating status: causing a specific light of the four indicator lights to illuminate in a second mode based at least in part on determining that the vehicle system is in the service status, wherein: the specific light is associated with a corresponding quadrant of the four quadrants; and the second mode comprises a first illumination pattern for the specific light and a second illumination pattern different from the first illumination pattern for a remaining three lights of the four indicator lights.

B. The vehicle system of clause A, wherein the vehicle system further comprises: a first light controller configured to control illumination of a first pair of lights of the four indicator lights located at the first end of the body: a second light controller configured to control illumination of a second pair of lights of the four indicator lights located at the second end of the body, and wherein the first light controller and the second light controller are each communicatively coupled with the at least one processor and configured to cause illumination of the four indicator lights based on instructions from the at least one processor.

C. The vehicle system of clause A or B, wherein: causing the four indicator lights to illuminate in the first mode comprises causing the four indicator lights to illuminate in a first color; and causing the specific light to illuminate in the second comprises causing the light to illuminate in a second color different from the first color.

D. The vehicle system of any of clauses A to C, wherein the computer-readable instructions comprise further instructions that, when executed by the at least one processor, cause the at least one processor to perform additional acts comprising: determining a service code indicating an error within a component of the vehicle system: determining a light pattern based on the service code, and wherein: determining the light of the four indicator lights to illuminate is based on a location of the component being within a first quadrant of the four quadrants; and causing the light to illuminate comprises causing the light to illuminate according to the light pattern.

E. The vehicle system of any of clauses A to D, A method comprising: determining a status for a symmetrical vehicle, wherein the symmetrical vehicle is substantially mirrored about a first axis and a second axis to define four quadrants of the symmetrical vehicle, the first axis extending from a first end to a second end of the symmetrical vehicle and the second axis perpendicular to the first axis and extending across a center of the symmetrical vehicle: causing indicator lights located on an exterior of the symmetrical vehicle and disposed in respective quadrants of the four quadrants to illuminate in a first mode based at least in part on determining the status for the symmetrical vehicle is a first status; and causing a specific light of the indicator lights to illuminate in a second mode based at least in part on determining the status for the symmetrical vehicle is a second status, wherein the specific light illuminates differently than remaining indicator lights to indicate a corresponding specific quadrant of the quadrants.

F. The method of clause E, wherein the first mode comprises an indication of whether the symmetrical vehicle is in an autonomous mode or a manual mode.

G. The method of clause E or F, wherein the second mode comprises identifying a quadrant of the four quadrants for determining an orientation of the symmetrical vehicle as part of a service request to service a component of the symmetrical vehicle, the method further comprising receiving a signal from at least one of: a location system indicating a location of the symmetrical vehicle within a geofenced service location; or a user device associated with a service location.

H. The method of any of clauses E to G, wherein the second mode comprises illuminating the light based on the light being associated with a quadrant of the four quadrants comprising a component associated with a fault of the symmetrical vehicle and wherein a color of the light is based on a category of the fault.

I. The method of any of clauses E to H, further comprises determining a service code indicating an error within a component of the symmetrical vehicle, and wherein the second mode is based on the service code.

J. The method of any of clauses E to I, further comprising determining a light pattern based on the service code, and wherein the second mode comprises the light pattern.

K. The method of any of clauses E to J, further comprising causing an audio device of the symmetrical vehicle to emit a tone associated the light illuminating in the second mode.

L. The method of any of clauses E to K, wherein the second mode comprises at least one of an illumination color or illumination pattern associated with a status of the symmetrical vehicle.

M. The method of any of clauses E to L, wherein the first mode comprises a first illumination color or a first pattern and the second mode comprises a second illumination color or a second pattern, the second illumination color different from the first illumination color and the second pattern different from the first pattern.

N. The method of any of clauses E to M, wherein determining the light of the indicator lights comprises determining a first quadrant based on a standardized fleetwide quadrant labeling scheme.

O. A non-transitory computer-readable medium storing instructions that, when executed by one or more processors, cause the one or more processors to perform acts comprising: determining a status for a symmetrical vehicle, wherein the symmetrical vehicle is mirrored about a first axis and a second axis to define four quadrants of the symmetrical vehicle, the first axis extending from a first end to a second end of the symmetrical vehicle and the second axis perpendicular to the first axis and extending across a center of the symmetrical vehicle: causing indicator lights located on an exterior of the symmetrical vehicle with each disposed in respective quadrants of the four quadrants to illuminate in a first mode based on determining the status of the symmetrical vehicle is a first status: determining a light of the indicator lights to illuminate in a second mode based on determining the status of the symmetrical vehicle is a second status; and causing the light to illuminate in the second mode, wherein in the second mode the light illuminates in a first pattern different from a second pattern of remaining indicator lights.

P. The non-transitory computer-readable medium of clause O, the acts further comprising determining a service code indicating an error within a component of the symmetrical vehicle, and wherein the second mode is based on the service code.

Q. The non-transitory computer-readable medium of clause O or P, the acts further comprising causing an audio device of the symmetrical vehicle to emit a tone associated the light illuminating in the second mode.

R. The non-transitory computer-readable medium of any of clauses O to Q, wherein the second mode comprises identifying a quadrant of the four quadrants for determining an orientation of the symmetrical vehicle as part of a service request to service a component of the symmetrical vehicle.

S. The non-transitory computer-readable medium of any of clauses O to R, wherein the second mode comprises illuminating the light based on the light being associated with a quadrant of the four quadrants comprising a component associated with a fault of the symmetrical vehicle.

T. The non-transitory computer-readable medium of any of clauses O to S, wherein the second mode comprises at least one of an illumination color or illumination pattern associated with a status of the symmetrical vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle system, comprising:
an autonomous vehicle chassis comprising:
a drive train configured to cause the vehicle system to traveling in a direction;
a body, which is mirrored about a first axis and a second axis to define four quadrants, the first axis extending from a first end to a second end of the body and the second axis perpendicular to the first axis and extending laterally across a center of the body; and
four indicator lights, arranged on an exterior of the body and each disposed in respective quadrants of the four quadrants; and
non-transitory computer-readable media storing instructions that, when executed by at least one processor, cause the vehicle system to perform acts comprising:
determining that the vehicle system is in a service status or an operating status;
causing the four indicator lights to illuminate in a first mode based at least in part on determining that the vehicle system is in the operating status;
causing a specific light of the four indicator lights to illuminate in a second mode based at least in part on determining that the vehicle system is in the service status, wherein:
the specific light is associated with a corresponding quadrant of the four quadrants; and
the second mode comprises a first illumination pattern for the specific light and a second illumination pattern different from the first illumination pattern for a remaining three lights of the four indicator lights.

2. The vehicle system of claim 1, wherein the vehicle system further comprises:
a first light controller configured to control illumination of a first pair of lights of the four indicator lights located at the first end of the body;
a second light controller configured to control illumination of a second pair of lights of the four indicator lights located at the second end of the body, and wherein the first light controller and the second light controller are each communicatively coupled with the at least one processor and configured to cause illumination of the four indicator lights based on instructions from the at least one processor.

3. The vehicle system of claim 1, wherein:
causing the four indicator lights to illuminate in the first mode comprises causing the four indicator lights to illuminate in a first color; and
causing the specific light to illuminate in the second mode comprises causing the specific light to illuminate in a second color different from the first color.

4. The vehicle system of claim 1, wherein the acts further comprise:
determining a service code indicating an error within a component of the vehicle system;
determining a light pattern based on the service code;
determining the specific light of the four indicator lights to illuminate based on a location of the component being within a first quadrant of the four quadrants; and
wherein causing the specific light to illuminate comprises causing the specific light to illuminate according to the light pattern.

5. A method comprising:
determining a status for a symmetrical vehicle, wherein the symmetrical vehicle is mirrored about a first axis and a second axis to define four quadrants of the symmetrical vehicle, the first axis extending from a first end to a second end of the symmetrical vehicle and the second axis perpendicular to the first axis and extending across a center of the symmetrical vehicle;
causing indicator lights located on an exterior of the symmetrical vehicle and disposed in respective quadrants of the four quadrants to illuminate in a first mode based at least in part on determining the status for the symmetrical vehicle is a first status; and
causing a specific light of the indicator lights to illuminate in a second mode based at least in part on determining the status for the symmetrical vehicle is a second status, wherein the specific light illuminates differently than remaining indicator lights to indicate a corresponding specific quadrant of the four quadrants.

6. The method of claim 5, wherein the first mode comprises an indication of whether the symmetrical vehicle is in an autonomous mode or a manual mode.

7. The method of claim 5, wherein the second mode comprises identifying a quadrant of the four quadrants for determining an orientation of the symmetrical vehicle as part of a service request to service a component of the symmetrical vehicle, the method further comprising receiving a signal from at least one of:
a location system indicating a location of the symmetrical vehicle within a geofenced service location; or
a user device associated with a service location.

8. The method of claim 5, wherein the second mode comprises illuminating the specific light based on the specific light being associated with a quadrant of the four quadrants comprising a component associated with a fault of the symmetrical vehicle and wherein a color of the specific light is based on a category of the fault.

9. The method of claim 5, further comprising determining a service code indicating an error within a component of the symmetrical vehicle, and wherein the second mode is based on the service code.

10. The method of claim 9, further comprising determining a light pattern based on the service code, and wherein the second mode comprises the light pattern.

11. The method of claim 9, further comprising causing an audio device of the symmetrical vehicle to emit a tone associated with the specific light illuminating in the second mode.

12. The method of claim 5, wherein the second mode comprises at least one of an illumination color or illumination pattern associated with a status of the symmetrical vehicle.

13. The method of claim 5, wherein the first mode comprises a first illumination color or a first pattern and the second mode comprises a second illumination color or a second pattern, the second illumination color different from the first illumination color and the second pattern different from the first pattern.

14. The method of claim 5, further comprising determining the specific light of the indicator lights by determining a first quadrant based on a standardized fleetwide quadrant labeling scheme.

15. A non-transitory computer-readable medium storing instructions that, when executed by one or more processors, cause the one or more processors to perform acts comprising:

- determining a status for a symmetrical vehicle, wherein the symmetrical vehicle is mirrored about a first axis and a second axis to define four quadrants of the symmetrical vehicle, the first axis extending from a first end to a second end of the symmetrical vehicle and the second axis perpendicular to the first axis and extending across a center of the symmetrical vehicle;
- causing indicator lights located on an exterior of the symmetrical vehicle with each disposed in respective quadrants of the four quadrants to illuminate in a first mode based on determining the status of the symmetrical vehicle is a first status;
- determining a light of the indicator lights to illuminate in a second mode based on determining the status of the symmetrical vehicle is a second status; and
- causing the light to illuminate in the second mode, wherein in the second mode the light illuminates in a first pattern different from a second pattern of remaining indicator lights.

16. The non-transitory computer-readable medium of claim 15, the acts further comprising determining a service code indicating an error within a component of the symmetrical vehicle, and wherein the second mode is based on the service code.

17. The non-transitory computer-readable medium of claim 16, the acts further comprising causing an audio device of the symmetrical vehicle to emit a tone associated with the light illuminating in the second mode.

18. The non-transitory computer-readable medium of claim 15, wherein the second mode comprises identifying a quadrant of the four quadrants for determining an orientation of the symmetrical vehicle as part of a service request to service a component of the symmetrical vehicle.

19. The non-transitory computer-readable medium of claim 15, wherein the second mode comprises illuminating the light based on the light being associated with a quadrant of the four quadrants comprising a component associated with a fault of the symmetrical vehicle.

20. The non-transitory computer-readable medium of claim 15, wherein the second mode comprises at least one of an illumination color or illumination pattern associated with the status of the symmetrical vehicle.

* * * * *